United States Patent
Iwatsuka et al.

(10) Patent No.: US 9,939,709 B2
(45) Date of Patent: Apr. 10, 2018

(54) OPTICAL WAVEGUIDE ELEMENT AND OPTICAL MODULATOR USING THE SAME

(71) Applicant: TDK Corporation, Tokyo (JP)

(72) Inventors: Shinji Iwatsuka, Tokyo (JP); Kenji Sasaki, Tokyo (JP); Satoshi Shirai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/236,633

(22) Filed: Aug. 15, 2016

(65) Prior Publication Data

US 2017/0052424 A1 Feb. 23, 2017

(30) Foreign Application Priority Data

Aug. 21, 2015 (JP) ................................. 2015-163353
Jan. 14, 2016 (JP) ................................. 2016-005297
Jul. 15, 2016 (JP) ................................. 2016-140137

(51) Int. Cl.
| | | |
|---|---|---|
| *G02F 1/225* | (2006.01) | |
| *G02B 6/28* | (2006.01) | |
| *G02B 6/122* | (2006.01) | |
| *G02B 6/126* | (2006.01) | |
| *G02F 1/21* | (2006.01) | |
| *G02B 6/293* | (2006.01) | |

(52) U.S. Cl.
CPC ............ *G02F 1/2257* (2013.01); *G02B 6/122* (2013.01); *G02B 6/126* (2013.01); *G02B 6/2813* (2013.01); *G02B 6/29352* (2013.01); *G02F 2001/212* (2013.01); *G02F 2202/20* (2013.01); *G02F 2203/07* (2013.01)

(58) Field of Classification Search
CPC ...... G02B 6/122; G02B 6/125; G02B 6/2813; G02B 6/126; G02F 2203/07; G02F 2202/20; G02F 2001/212; G02F 1/2257
USPC ....... 385/1–10, 129–132; 359/237, 245, 330, 359/332
See application file for complete search history.

(56) References Cited

U.S. PATENT DOCUMENTS

| | | | |
|---|---|---|---|
| 2007/0297732 A1* | 12/2007 | Mason ............... | G02B 6/12004 385/122 |
| 2015/0138019 A1 | 5/2015 | Iwatsuka et al. | |
| 2016/0377953 A1* | 12/2016 | Feng ....................... | G02F 1/025 385/2 |

FOREIGN PATENT DOCUMENTS

| | | |
|---|---|---|
| JO | 2015-014716 | 1/2015 |
| JP | 2014-006348 | 1/2014 |
| JP | 2015-230466 | 6/2014 |
| JP | 2014142411 | 8/2014 |
| JP | 2015-118371 | 11/2014 |

* cited by examiner

*Primary Examiner* — Akm Enayet Ullah
*Assistant Examiner* — Michael Mooney
(74) *Attorney, Agent, or Firm* — Young Law Firm, P.C.

(57) ABSTRACT

Disclosed herein is an optical waveguide element that includes a substrate and a waveguide layer formed on the substrate and comprising lithium niobate. The waveguide layer has a slab part having a predetermined thickness and a ridge part protruding from the slab part. The maximum thickness of the slab part is 0.05 times or more and less than 0.4 times a wavelength of a light propagating in the ridge part.

6 Claims, 28 Drawing Sheets

|  |  | W1/λ | | | | | | | | |
|---|---|---|---|---|---|---|---|---|---|---|
|  |  | 1.03 | 0.90 | 0.77 | 0.65 | 0.52 | 0.45 | 0.39 | 0.26 | 0.13 |
| INCLINATION ANGLE (deg) | 60 | × | × | × | × | × | × | × | × | × |
|  | 65 | × | × | × | × | × | × | × | × | × |
|  | 70 | × | × | × | × | × | ○ | ○ | ○ | × |
|  | 75 | × | × | × | ○ | ○ | ○ | ○ | ○ | × |
|  | 80 | × | ○ | ○ | ○ | ○ | ○ | ○ | ○ | × |
|  | 85 | ○ | ○ | ○ | ○ | ○ | ○ | ○ | × | × |
|  | 90 | ○ | ○ | ○ | ○ | ○ | ○ | ○ | × | × |

FIG.26

|  |  | W1/λ | | | | | | |
|---|---|---|---|---|---|---|---|---|
|  |  | 0.39 | 0.52 | 0.65 | 0.77 | 0.90 | 1.03 | 1.16 |
| T2/λ | 0.45 | × | × | × | × | × | × | × |
|  | 0.42 | × | × | × | × | × | × | × |
|  | 0.39 | × | × | × | × | × | × | × |
|  | 0.35 | × | × | × | ○ | ○ | × | × |
|  | 0.32 | × | × | ○ | ○ | ○ | ○ | × |
|  | 0.29 | × | ○ | ○ | ○ | ○ | ○ | ○ |
|  | 0.26 | ○ | ○ | ○ | ○ | ○ | ○ | ○ |

FIG.27

|  |  | T3/λ | | | |
|---|---|---|---|---|---|
|  |  | 0.06 | 0.13 | 0.19 | 0.26 |
| T2/λ | 0.45 | × | × | × | × |
|  | 0.42 | × | × | × | × |
|  | 0.39 | × | × | × | × |
|  | 0.35 | ○ | ○ | ○ | × |
|  | 0.32 | ○ | ○ | ○ | ○ |
|  | 0.29 | ○ | ○ | ○ | ○ |
|  | 0.26 | ○ | ○ | ○ | ○ |

FIG.28

OPTICAL WAVEGUIDE ELEMENT AND OPTICAL MODULATOR USING THE SAME

BACKGROUND OF THE INVENTION

Field of the Invention

This invention relates to an optical waveguide element and an optical modulator used in the field of optical communication and optical instrumentation. More particularly, the invention relates to an optical waveguide element having a ridge structure, and to an optical modulator using this optical waveguide element.

Description of Related Art

As the use of the Internet spreads, the amount of data communicated is rapidly increasing, making the optical fiber communication very important. In the optical fiber communication, electric signals are converted into optical signals, and the optical signals are transmitted through optical fibers. The optical fiber communication is characterized in that the signals are transmitted in the broad band, with a small loss, and are not affected by noise.

Known as systems for converting electric signals into optical signals are the direct modulation system using a semiconductor laser and the external modulation system using optical modulators. The direct modulation system need not use optical modulators and its running cost is low, but cannot achieve high-speed modulation. This is why the external modulation system is used in high-speed, long-distance data communication.

In practically used optical modulators, an optical waveguide is formed by titanium (Ti) diffusion in the vicinity of a surface of a single-crystal lithium niobate substrate. High-speed optical modulators of 40 Gb/s or more are commercially available. However, these high-speed optical modulators have the drawback of having a length as long as approximately 10 cm.

Japanese Patent Application Laid-Open Nos. 2014-006348, 2014-142411 and 2015-014716 disclose Mach-Zehender optical modulators, each having a sapphire single-crystal substrate and a lithium niobate film epitaxially formed on the substrate, 2 μm or less thick, c-axis orientated and shaped like a ridge. Any optical modulator that has a lithium niobate film is much smaller than, and can be driven at a lower voltage than, the optical modulator having a lithium niobate signal-crystal substrate.

FIG. 30 is a sectional view of a ridge-shaped optical waveguide element 400 of conventional type. The optical waveguide element 400 includes a substrate 1 and a waveguide layer 2 formed on the substrate 1. The waveguide layer 2 is made of lithium niobate and has a ridge part 3. The ridge part 3 is a projection having ridge width W and thickness T1. Slab parts 4 are provided at the both sides of the ridge part 3, respectively, and have thickness T2 (<T1).

The conventional optical waveguide element 400 is disadvantageous in that the propagation loss is large in TM fundamental mode. The reason why a propagation loss of the element 400 is large in TM fundamental mode is the coupling of TM fundamental mode to TE higher-order mode. In TE higher-order mode, light propagates to, for example, the slab parts 4 located outside the ridge part 3, not restricted by the ridge part 3. Hence, the propagation loss in TM fundamental mode can be reduced by suppressing the coupling of TM fundamental mode to TE higher-order mode.

The conventional optical waveguide element 400 is disadvantageous, also in that the propagation loss in TM fundamental mode increases if the ridge width W decreases. Moreover, the propagation loss abruptly increases even if the shape of the ridge part 3 differs only a little from the design shape. In such a case, the propagation loss may increase due to a variation in manufacturing processes.

SUMMARY

It is therefore an object of the present invention to provide a ridge-shaped optical waveguide element that suppresses the coupling of TM fundamental mode to TE higher-order mode, thereby to reduce the propagation loss in TM fundamental mode, and to provide an optical modulator having the optical waveguide element.

Another object of the present invention is to provide a ridge-shaped optical waveguide element that can reduce the propagation loss in TM fundamental mode even if the ridge with W is decreased, and to provide an optical modulator having the optical waveguide element.

Still another object of this invention is to provide a ridge-shaped optical waveguide element that constantly has a small propagation loss, not affected by dimensional changes, if any, during the manufacture, and to provide an optical modulator having the optical waveguide element.

The profound study of the inventors hereof have found that the conventional ridge-shaped optical waveguide has a large propagation loss in TM fundamental mode because TM fundamental mode is coupled to TE slab mode. In TM mode, the main part of the electric field is perpendicular to the major surface of the substrate 1 (i.e., vertical direction in FIG. 30). In TE mode, the main part of the electric field is parallel to the major surface of the substrate 1 (i.e., horizontal direction in FIG. 30). In fundamental mode, the main part of the electric field exits in the region of the ridge 3, and the field intensity is maximal at one point in the electric field. The higher-order mode is another mode, other than the fundamental mode, and is, for example, slab mode. In the slab mode, the main part of the electric field exits in the slab parts 4. For simplicity, the mode that is both TM mode and fundamental mode shall be called "TM fundamental mode," and the mode that is both TE mode and fundamental mode shall be called "TE fundamental mode." Further, the mode that is both TE mode and slab mode shall be called "TE slab mode," and the mode that is both TM mode and slab mode shall be called "TM slab mode." In the c-axis orientated lithium niobate film, the electro-optical effect in TM fundamental mode is about three times as great as the electro-optical effect in TE fundamental mode. Hence, TM fundamental mode is usually utilized.

To reduce the coupling to TE slab mode, the optical waveguide element may be so shaped that the effective refractive index of TE slab mode is lower than the effective refractive index of TM fundamental mode. This invention is based on this technical finding. An optical waveguide element according to the invention comprises a substrate and a waveguide layer made of lithium niobate and formed on the substrate. The waveguide layer has a slab part having a predetermined thickness and a ridge part protruding from the slab part. The optical waveguide element is characterized in that the maximum thickness of the slab part is 0.05 times or more, but less than 0.4 times the wavelength of the light propagating in the ridge part.

In this invention, the effective refractive index for TE slab mode sufficiently decreases. The TM fundamental mode and the TE slab mode are therefore scarcely coupled to each other, and the propagation loss in the TM fundamental mode can be suppressed. Further, if the optical waveguide element according to this invention is used in an optical modulator, the value of VπL can fall within a desirable range.

In this invention, the width of the ridge part is preferably 0.1 times or more, but less than 1.0 time, the wavelength of the light propagating in the ridge part. The invention can, therefore, provide a single-mode optical waveguide element that confines light at the ridge part.

In this invention, the slab part may have a uniform thickness. This prevents the processing of the waveguide layer from becoming complicated.

In this invention, the thickness of the ridge part is preferably 0.5 times or more, but less than 2.0 times, the wavelength of the light propagating in the ridge part. This can prevent the optical waveguide element from operating in multimode, and light can be efficiently confined at the ridge part.

In this invention, the sides of the ridge part are preferably inclined by 70° or more. This means that the sides of the ridge part need not be completely vertical. Even if the sides of the ridge part are inclined, the optical waveguide element can acquire desirable characteristics so long as the inclination angle is 70° or more.

In this invention, the slab part may have inclining parts located at the sides of the ridge part, respectively, and gradually thinned away from the ridge part. This prevents the propagation loss from abruptly changing even if the shape of the ridge part differs a little from the design shape. The propagation loss can therefore remain small.

In this case, the maximum thickness of the inclining part is preferably 0.1 times or more and less than 0.37 times the wavelength of the light propagating in the ridge part, the width of the ridge part is preferably 0.3 times or more, but less than 1.2 times, the wavelength of the light propagating in the ridge part, and the thickness of the ridge part is preferably 0.5 times or more, but less than 2.0 times, the wavelength of the light propagating in the ridge part. Then, the optical waveguide element does not operate in a mixed mode, and can efficiently confine light at the ridge part. The "mixed mode" is mixture of TM mode and TE mode. If the optical waveguide element operates in the mixed mode, the coupling loss between the waveguide and an optical fiber will increase. If the element is used in an optical modulator, the extinction ratio will decrease, the insertion loss will increase, and VπL will increase. Hence, the optical waveguide element should be operated in almost pure TM mode.

An optical modulator according to this invention is characterized in that it has an optical waveguide having an optical waveguide element according to the invention. The optical modulator, which has a high-performance optical waveguide element, has a low insertion loss and a large extinction ratio.

In this invention, the coupling of TM fundamental mode (m=0) to TE higher-order mode (TE slab mode, TE m=1 mode etc.) can be suppressed. This invention can therefore provide an optical waveguide element that can stably have a low propagation loss, and also an optical modulator using the optical waveguide element.

Further, this invention can provide an optical waveguide element that can stably have a low propagation loss, not influenced by dimensional changes, if any, occurring during the manufacture of the element, and can provide an optical modulator having this optical waveguide element.

Moreover, this invention can provide an optical modulator which has an optical waveguide element according to the invention and which can therefore has a small insertion loss and VπL of small value.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 15A illustrates only the optical waveguide, and FIG. 15B illustrates main components of the optical modulator 200B, including the electrodes;

FIG. 19A illustrates only the optical waveguide, and FIG. 19B illustrates main components of the optical modulator 200B, including the traveling-wave electrodes;

FIG. 26 is a table showing a data of the example 7;

FIG. 27 is a table showing a data of the example 8;

FIG. 28 is a table showing a data of the example 9;

DETAILED DESCRIPTION OF THE EMBODIMENTS

Figure 1:
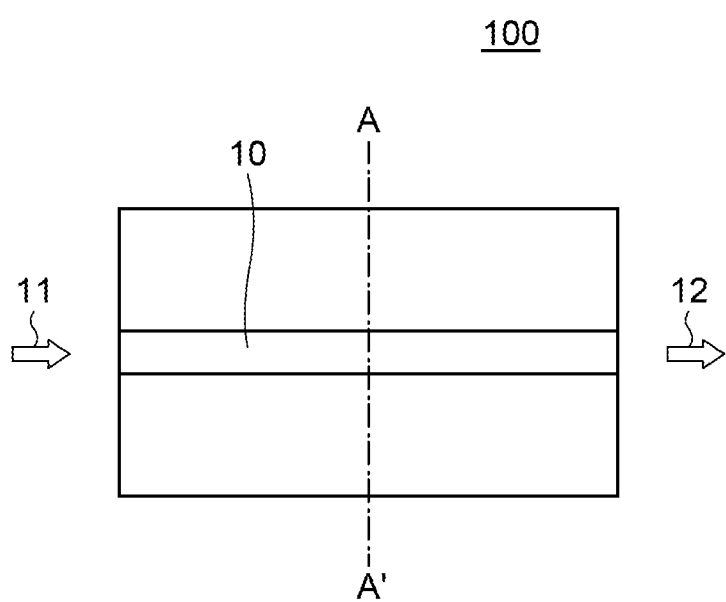
FIG. 1 is a plan view showing the configuration of an optical waveguide element according to an embodiment of the present invention.

Embodiments of the present invention will be described with reference to the accompanying drawings. This invention is not limited to the embodiments described below. The components described below may include some that can be anticipated by any person with ordinary skill in the art, be substantially identical to those known to such a person, or may be used in any possible combination. The drawing is schematic, and the relation between the thickness and planer size of each component shown may differ from the actual one, so long as the advantage of the invention can be achieved in any embodiment.

FIG. 1 is a plan view showing the configuration of an optical waveguide element 100 according to an embodiment of the present invention. The optical waveguide element 100 has an optical waveguide 10. The light applied from an input side 11 propagates through the optical waveguide 10 and emerges at an output side 12.

First Embodiment

Figure 2:
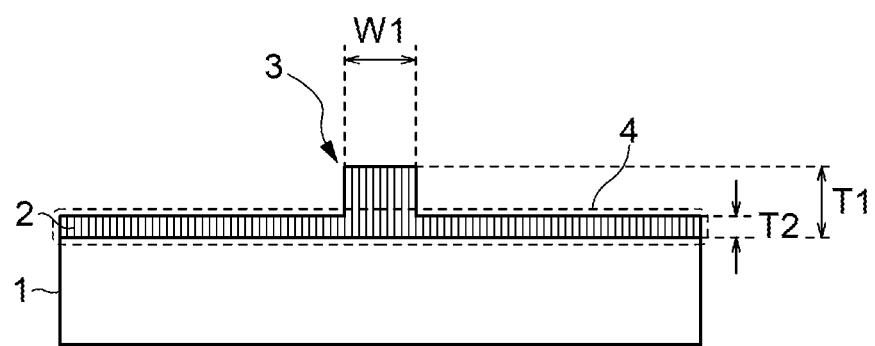
FIG. 2 is a cross sectional view taken along line A-A' shown in FIG. 1, and shows the structure of an optical waveguide element according to a first embodiment of the present invention.

FIG. 2 is a cross sectional view of the optical waveguide element 100, taken along line A-A' shown in FIG. 1, and shows the structure of an optical waveguide element 100A according to the first embodiment. The optical waveguide element 100A includes a substrate 1 and a waveguide layer 2 formed on the substrate 1. The waveguide layer 2 has an optical waveguide 10, which has a ridge part 3 having a ridge-shaped cross section. The ridge part 3 is a projection having ridge width W1 and thickness T1. In the optical waveguide element of FIG. 1, the sides of the ridge part 3 are substantially perpendicular to the substrate 1. The waveguide layer 2 further has a slab part 4 having thickness T2, outside a region where the optical waveguide 10 is formed, apart from the ridge part 3. In this embodiment, the slab part 4 includes only a flat layer having a substantially uniform thickness.

The waveguide layer 2 is made mainly of lithium niobate ($LiNbO_3$). Lithium niobate has a large electro-optical constant, and is material for optical devices such as the optical modulator. The waveguide layer 2 is a lithium niobate film having the composition of $Li_xNbA_yO_z$, where A is an element other than Li, Nb and O, x is 0.5 to 1.2, preferably 0.9 to 1.05, y is 0 to 0.5, and z is 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

The slab part 4 has thickness T2 so that the effective refractive index for TM fundamental mode may be larger than the effective refractive index for TE slab mode.

More specifically, if the thickness T2 of the slab part 4 is reduced to satisfy $0.05 \leq T2/\lambda < 0.4$, where $\lambda$ is the wavelength of light propagating in the ridge part 3, the effective refractive index for TE slab mode can be smaller than the effective refractive index for TM fundamental mode even if the ridge width W1 is made smaller to some degree. If the effective refractive index for TE slab mode is smaller than the effective refractive index for TM fundamental mode, the coupling to TM fundamental mode will greatly decrease, reducing the propagation loss in TM fundamental mode.

In this embodiment, the slab part 4 has a substantially uniform thickness T2. Therefore, the ridge part 3 has a simple one-step shape. This is because more complicated processing is required to form a ridge part having two or more steps. A structure having parts gently tapered from the root of the ridge part to the left and right slab parts, as seen in cross section, will be described in connection with the second embodiment.

Preferably, the width W1 of the ridge part 3 should be:

$0.1 \leq W1/\lambda < 1.0$.

If the width W1 of the ridge part 3 has this value, the optical waveguide element 100A can be driven, substantially in the single mode, and the light can be fully confined at the ridge part 3. If the width W1 of the ridge part 3 is less than $0.1\lambda$, the light cannot be fully confined at the ridge part 3. If the width W1 of the ridge part 3 is equal to, or greater than, $1\lambda$, the element 100A may operate in multimode.

If the width W1 of the ridge part 3 is decreased, the effective refractive index for TM fundamental mode will decrease. In this case, the thickness T2 of the slab part 4 should therefore be reduced. This means that even if the following relation is satisfied, the effective refractive index for TM fundamental mode will not always exceed the effective refractive index for TE slab mode, and also that $T2/\lambda$ should be decreased if the ridge with W1 is small.

$0.05 \leq T2/\lambda < 0.4$

On the other hand, the thickness T1 of the ridge part 3 should preferably be:

$0.5 \leq T1/\lambda \leq 2.0$.

More preferably, the thickness Ti of the ridge part 3 should be:

$0.6 \leq T1/\lambda \leq 1.5$.

This is because if the ridge part 3 is too thin, the light is weakly confined in the waveguide layer 2 and the waveguide may not perform its function. Conversely, if the ridge part is too thick, the manufacture processing will become difficult, and the element 100A will be more likely to operate in multimode.

The substrate 1 is not limited in material if it has a smaller refractive index than the lithium niobate film. Nonetheless, the substrate should preferably be one on which a lithium niobate film can be formed as epitaxial film. In view of this, a sapphire single-crystal substrate or a silicon single-crystal substrate is desirable. The crystal orientation of the single-crystal substrate is not limited to any particular one. Lithium niobate film can be easily formed as c-axis orientated epitaxial film on single-crystal substrates of various crystal orientations. Since the c-axis orientated lithium niobate film has three-fold symmetry, the single-crystal substrate on which it is formed should desirably have the same symmetry. Hence, it is preferable that the substrate has c-plane if it is a sapphire single-crystal substrate, or (111) plane if it is a silicon single-crystal substrate.

The term "epitaxial film", as used herein, refers to a film having the crystal orientation of the underlying substrate or film. The crystal of an epitaxial film is uniformly oriented along the X-axis and Y-axis on the film surface and along the Z-axis in the thickness direction. For example, an epitaxial film can be confirmed by first measuring the peak intensity at the orientation position by $2\theta$-$\theta$ X-ray diffraction and secondly observing poles.

More specifically, first, in the 2θ-θ X-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since LiNbO3 has a trigonal crystal system, single-crystal LiNbO3 (014) has 3 poles. For the lithium niobate film, it is known that crystals rotated 180 degrees about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has fourfold symmetry, and 4×3=12 poles are observed. In the present invention, the lithium niobate film epitaxially grown in the twin crystal state is also considered to be an epitaxial film.

It is desirable to form the lithium niobate film by a film forming method such as sputtering, CVD or sol-gel process. If the c-axis is orientated perpendicular to the major surface of the single-crystal substrate, an electric field is applied parallel to the c-axis, thereby changing the optical refractive index in proportion to the intensity of the electric field. If the single-crystal substrate is sapphire, a lithium niobate film is formed by epitaxial growth directly on the sapphire single-crystal substrate. If the single-crystal substrate is a silicon substrate, a lithium niobate film is formed by epitaxial growth on the cladding layer (not shown) formed on the substrate. The cladding layer (not shown) is made of material which has a smaller refractive index than lithium niobate film and which well undergoes epitaxial growth. If the cladding layer (not shown) is made of $Y_2O_3$, a lithium niobate film of high quality can be formed.

As is known in the art, the lithium niobate film may be formed by polishing a lithium niobate single-crystal substrate, reducing the thickness thereof. This method is advantageous in that the polished substrate acquires the characteristic as single crystal, and can therefore be used in the present invention.

Figure 3:
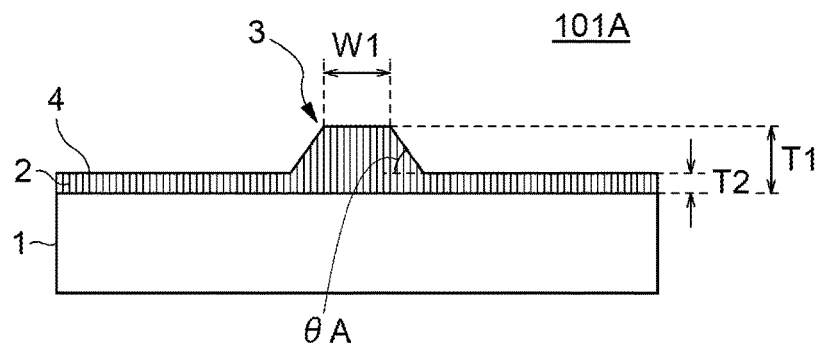
FIG. 3 is a sectional view of an optical waveguide element according to a first modification of the first embodiment.

FIG. 3 is a sectional view of an optical waveguide element 101A according to the first modification of this embodiment. As seen from FIG. 3, the sides of the ridge part 3 of the optical waveguide element 101A are not exactly perpendicular to the substrate 1, inclining at a specific inclination angle θA. In this respect, the optical waveguide element 101A differs from the optical waveguide element 100A shown in FIG. 2. In any other structural respects, the optical waveguide element 101A is identical to the optical waveguide element 100A shown in FIG. 2. Therefore, the components identical to those of the optical waveguide element 100A are designated by the same reference numbers and will not be described repeatedly.

Since the ridge part 3 has a trapezoidal cross section, the width of its upper surface shall be defined as ridge width W1. The inclination angle θA should be as close to 90° as possible, but may be at least 70°. If the inclination angle θA is 70° or more, the optical waveguide element 101A can operate in pure TM mode not mixing with TE mode, provided that the ridge width W1 has an appropriate value. If the inclination angle θA is hardly less than 70°, optical waveguide element 101A can hardly operate in pure TM mode not mixing with TE mode at all.

Figure 4:
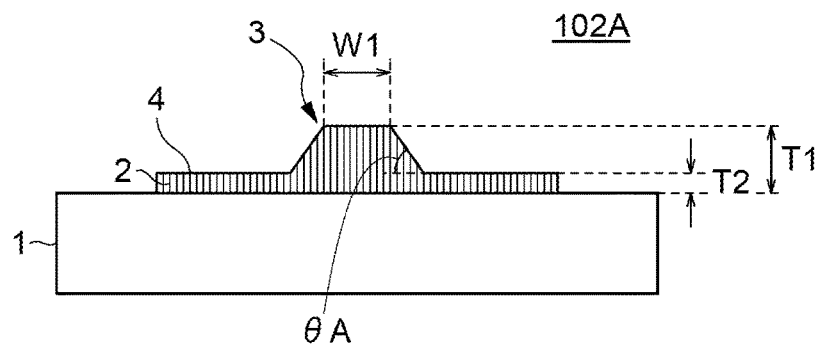
FIG. 4 is a sectional view of an optical waveguide element according to a second modification of the first embodiment.

FIG. 4 is a sectional view of an optical waveguide element 102A according to the second modification of this embodiment. In the optical waveguide element 102A shown in FIG. 4, the slab part 4 has a width smaller than the width of the substrate 1. A part of the substrate 1 is therefore exposed, not covered with the slab part 4. The optical waveguide element 102A differs, in this respect, from the optical waveguide element 101A shown in FIG. 3. In any other respects, it is identical to the optical waveguide optical waveguide element 101A shown in FIG. 3. Therefore, the components identical to those of the optical waveguide element 101A are designated by the same reference numbers and will not be described repeatedly.

As exemplified in the modification of FIG. 4, the slab part 4 need not have the same width as the substrate 1 in the present invention. Rather, parts of the substrate 1 may be exposed, not covered with the slab part 4.

Figure 5:
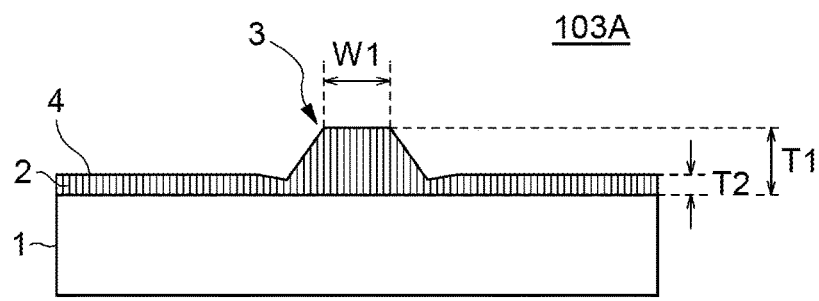
FIG. 5 is a sectional view of an optical waveguide element according to a third modification of the first embodiment.

FIG. 5 is a sectional view of an optical waveguide element 103A according to the third modification of this embodiment. The optical waveguide element 103A shown in FIG. 5 differs from the optical waveguide element 101A shown in FIG. 3, in that those parts of the slab part 4, which are close to the ridge part 3, are thinner than the other parts. In any other respects, the optical waveguide element 103A is identical to the optical waveguide optical waveguide element 101A shown in FIG. 3. Therefore, the components identical to those of the optical waveguide element 101A are designated by the same reference numbers and will not be described repeatedly.

The slab part 4 can be so shaped in some cases, depending on the condition of etching the waveguide layer 2. As exemplified in the modification of FIG. 5, the thickness T2 of the slab part 4 need not be completely uniform. The thickness T2 may rather change, from part to part. In such a case, the maximum thickness of the slab part 4 is defined as thickness T2.

Figure 6:
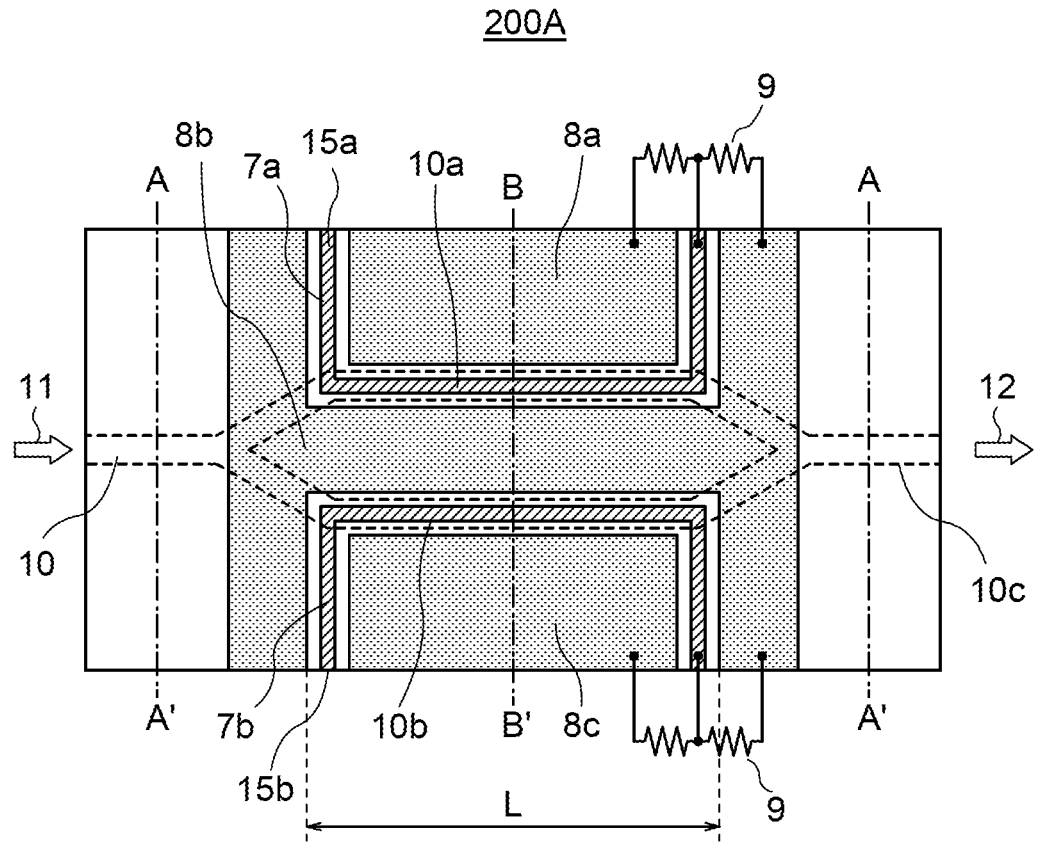
FIG. 6 is a plan view of a Mach-Zehender optical modulator according to an embodiment of the present invention.

FIG. 6 is a plan view of a Mach-Zehnder optical modulator 200A according to the embodiment of this invention. The optical modulator 200A is a device that applies a voltage to the Mach-Zehnder interferometer including an optical waveguide 10, thereby modulating the light propagating the optical waveguide 10. The optical waveguide 10 is branched into two optical waveguides 10a and 10b. Two first electrodes 7a and 7b are assigned to the optical waveguides 10a and 10b, respectively, forming a dual-drive electrode structure.

Figure 7:
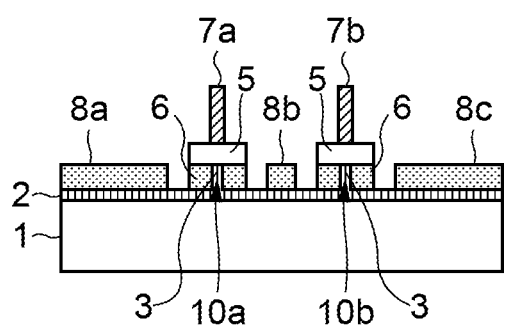
FIG. 7 is a cross sectional view taken along line B-B' shown in FIG. 6.

FIG. 7 is a cross sectional view of the optical modulator 200A, taken along line B-B' shown in FIG. 6. The sectional view thereof taken along line A-A' is similar to the sectional view of the optical waveguide element 100A shown in FIG. 2.

In this embodiment, the substrate 1 is a sapphire substrate and a lithium niobate film is formed on the major surface of the sapphire substrate and used as waveguide layer 2. The waveguide layer 2 has optical waveguides 10a and 10b, each composed of a ridge part 3. A buffer layer 5 is formed on the ridge part 3 constituting the optical waveguide 10a, and a first electrode 7a is formed on the buffer layer 5. Similarly, a buffer layer 5 is formed on the ridge part 3 constituting the waveguide 10b, and a first electrode 7b is formed on the buffer layer 5. Second electrodes 8a, 8b and 8c are spaced part, with the first electrode 7a located between the electrodes 8a and 8b, and with the first electrode 7b located between the electrodes 8b and 8c. The second electrodes 8a, 8b and 8c are formed, contacting the upper surface of the slab part 4 of the waveguide layer 2.

Dielectric layers 6 are formed, each contacting the lower surface of the associated buffer layer 5 and the sides of the associated ridge part 3.

The operating principle of the optical modulator 200A will be explained. As shown in FIG. 6, the two first electrodes 7a and 7b are connected to the second electrodes 8a, 8b and 8c via terminal resistors 9, and function as traveling-wave electrodes. The second electrodes 8a, 8b and 8c are used as ground electrodes, and receive two so-called complementary signals, i.e., positive and negative signals having the same absolute value, not out of phase, from the input sides 15a and 15b of the first electrodes 7a and 7b of the optical modulator 200A. Since the lithium niobate film has electro-optical effect, the refractive indices of the optical waveguides 10a and 10b change to $+\Delta n$ and $-\Delta n$, respectively, by the electric fields applied to the optical waveguides 10a and 10b. The phase difference between the optical waveguides 10a and 10b therefore changes, modulating the intensity of signal light. The signal light so modulated in intensity is output from an optical waveguide 10c provided in the output side of the optical modulator 200A.

The waveguide layers 2 provided in the optical waveguides 10a, 10b and 10c have the same shape as described with reference to FIG. 2. That is, the layers 2 have a ridge part 3 and a slab part 4 having small thickness T2 that satisfies the following relation:

$$0.05 \leq T2/\lambda \leq 0.4,$$

where $\lambda$ is the wavelength of the light propagating through the ridge part 3. The effective refractive index for TM fundamental mode can therefore be larger than the effective refractive index for TE slab mode. Hence, the propagation loss in the TM fundamental mode can be greatly reduced.

If the thickness T2 of the slab part 4 is less than 0.05$\lambda$, the electric field applied to the ridge part 3 will become weak, hardly modulating the light sufficiently, even if a voltage is applied between the first electrodes 7a and 7b, on one hand, and the second electrodes 8a, 8b and 8c, on the other. This inevitably degrades V$\pi$L.

Preferably, the ridge width W1 should have the following value:

$$0.1 \leq W1/\lambda \leq 1.0.$$

If the ridge width W1 should have this value, the optical modulator 200A can operate, substantially in the single mode, and the light can be fully confined in the ridge part 3.

As described above, in the optical waveguide element 100A and the optical modulator 200A, both according to the present invention, the slab part 4 has thickness 12 of 0.05$\lambda$ or more, but less than 0.4$\lambda$. The effective refractive index for TM fundamental mode can be larger than the effective refractive index for TE slab mode. Therefore, the coupling of TM fundamental mode to TE higher-order mode can decrease, thereby it is possible to reduce the propagation loss in TM fundamental mode.

Second Embodiment

The second embodiment of this invention will now be described.

Figure 8:
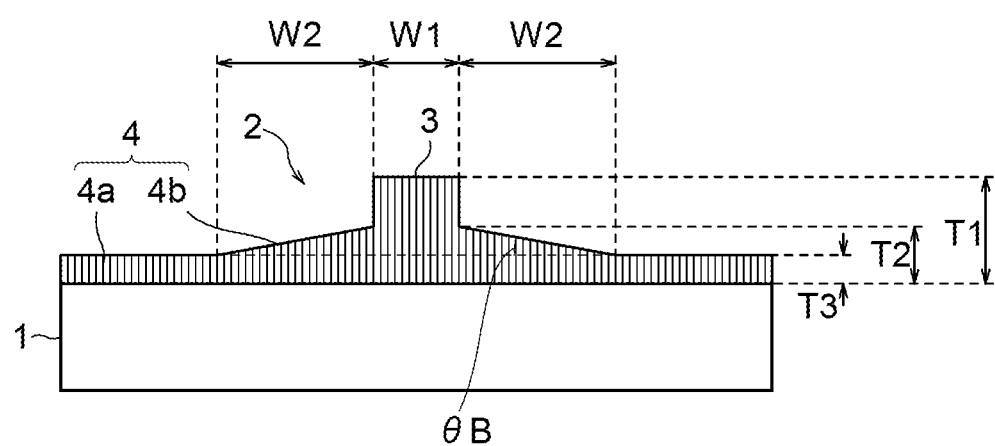
FIG. 8 is a cross sectional view taken along line A-A' shown in FIG. 1, and shows the structure of an optical waveguide element according to a second embodiment of the present invention.

FIG. 8 is a sectional view of the optical waveguide element 100B according to the second embodiment of the present invention, taken along line A-A' shown in FIG. 1. The optical waveguide element 100B differs from the optical waveguide element 100A shown in FIG. 2 according to the first embodiment, in that the slab part 4 includes a flat part 4a and an inclining part 4b. In any other structural respects, the optical waveguide element 100B is identical to the optical waveguide element 100A shown in FIG. 2 according to the first embodiment. Therefore, the components identical to those of the optical waveguide element 100A are designated by the same reference numbers and will not be described repeatedly.

The flat part 4a of the slab part 4 has thickness that is almost uniform, i.e., thickness T3. The inclining part 4b of the slab part 4 is gradually thinned away from the ridge part 3, and has the maximum thickness T2. Hence, the maximum thickness T2 each slab part 4 has is the maximum thickness of the inclining part 4b in this embodiment.

In this embodiment, the width (ridge width) W1 of the ridge part 3 should preferably be:

$$0.3 \leq W1/\lambda \leq 1.2.$$

If the ridge width W1 satisfies this relation, the optical waveguide element 100B can operate in almost pure TM mode, not in TM-TE mixed mode, if an appropriate maximum thickness T2 is set for the inclining part 4b. If the ridge width W1 is less than 0.3$\lambda$, however, the light will be insufficiently confined in the ridge part 3. If the ridge width W1 exceeds 1.2$\lambda$, the main component of TE m=1 mode will exist not in the inclining part 4b, but in the ridge part 3, and the optical waveguide element 100B will inevitably operate in TM-TE mixed mode even if the maximum thickness T2 of the inclining part 4b is changed.

In this embodiment, too, the thickness T1 of the ridge part 3 should preferably be:

$$0.5 \leq T1/\lambda \leq 2.0,$$

more suitably, $$0.6 \leq T1/\lambda \leq 1.5.$$

If the ridge part 3 is too thin, the light will be insufficiently confined in the ridge part 3, and the optical waveguide element 100B will probably cease to function as an optical waveguide. If the ridge part 3 is too thick, it will be difficult to manufacture the optical waveguide element 100B.

Figure 9A:
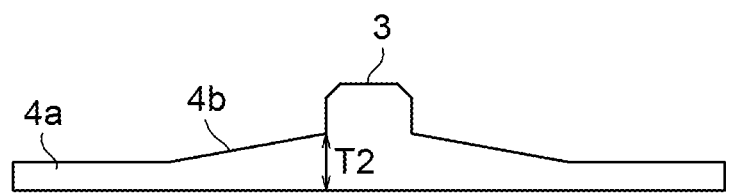
FIGS. 9A and 9B are schematic sectional views showing some variations of ridge part.
Figure 9B:
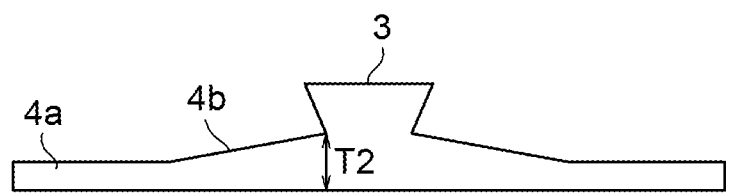

It is most desirable that the sides of the ridge part 3 should be perpendicular to the substrate 1 and the upper surface of the ridge part 3 should be horizontal to the substrate 1. Nevertheless, this invention is not limited to this configuration. The ridge part 3 may be chamfered at corners as shown in FIG. 9A, or the sides of the ridge part 3 may be inclined as shown in FIG. 9B. If the thickness T1 of the ridge part 3 varies from one planer position to another as shown in FIG. 9A, its maximum value is defined as thickness T1. If the width of the ridge part 3 varies from one height position to another as shown in FIG. 9B, its average value is defined as width W1.

Figure 10A:
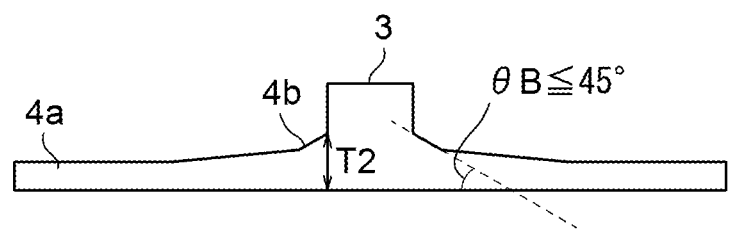
FIGS. 10A and 10B are schematic sectional views showing some variations of inclining part.
Figure 10B:
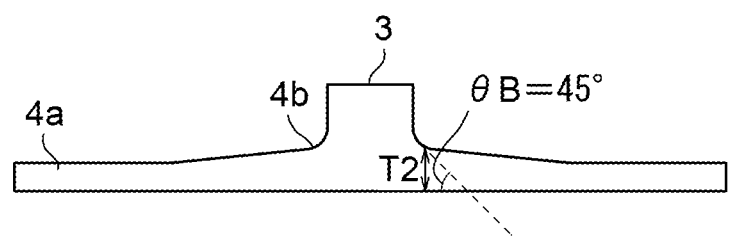

The inclining part 4b is gradually thin away from the ridge part 3, and incline by the inclination angle $\theta$B of 45° or less. The inclination angle $\theta$B may be constant as shown in FIG. 8. Alternatively, the inclination angle $\theta$B may decrease stepwise away from the ridge part 3 as shown in FIG. 10A, or gradually away from the ridge part 3 as shown in FIG. 10B. Any part inclined by more than 45° is defined as a part of the ridge part 3. In the case where the inclination angle $\theta$B gradually decreases away from the ridge part 3 as shown in FIG. 10B and exceeds 45° near the ridge part 3 as shown in FIG. 10B, the horizontal position where the inclination angle $\theta$B is 45° is defined as boundary between the ridge part 3 and the inclining part 4b, and the thickness the film has at the boundary is defined as maximum thickness T2 of the inclining part 4b.

The flat part 4a is that part of the slab part 4, which has an almost uniform thickness. Their thickness T3 should preferably satisfy the following relation:

$$T3/\lambda<0.37$$

Then, the effective refractive index for TE slab mode can be smaller than the effective refractive index for TM fundamental mode even if the ridge width W1 is reduced to some extent. If the effective refractive index for TE slab mode is smaller than the effective refractive index for TM fundamental mode, the coupling of TM fundamental mode to TE slab mode is much suppressed, reducing the propagation loss in TM fundamental mode.

The difference between the maximum thickness T2 of the inclining part 4b and the thickness T3 of the flat part 4a is not limited so long as T2>T3. However, the difference between the thickness T2 and thickness T3 is desirably as follows:

$$T2-T3 \geq 0.05 \; \mu m.$$

The width W2 of the inclining part 4b is not limited. However, it may range from 0.5 µm to 50 µm in most cases.

The optical waveguide element 100B according to this embodiment has an inclining part 4b between the ridge part 3 and the flat part 4a. The optical waveguide element 100B may be more likely to operate in TM-TE mixed mode, i.e., mixture of TM fundamental (m=0) mode and TE higher-order mode. If it operates in TM-TE mixed mode, problems will arise, such as decrease in extinction ratio, increase in insertion loss and the rising of VπL. The TM-TE mixed mode is due to a condition is satisfied that the effective refractive index for TM fundamental (m=0) mode is almost equal to the effective refractive index for TE higher-order mode such as TE, m=1 mode.

In order to make the optical waveguide element 100b operate not in the mixed mode, the maximum thickness T2 of the inclining part 4b should better have a value falling within the following range:

$$0.1 \leq T2/\lambda \leq 0.37.$$

If the maximum thickness T2 of the inclining part 4b falls within this range, the effective refractive index for TE slab (m=1) mode is smaller than the effective refractive index for TM fundamental (m=0) mode. Then, the optical waveguide element 100b operates not in the mixed mode, but in almost pure TM mode.

Figure 11A:
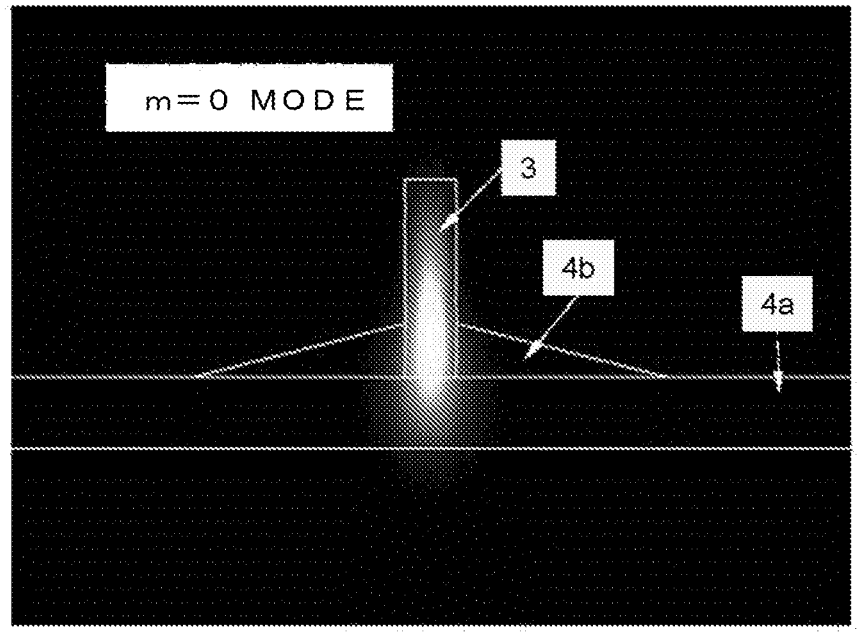
FIGS. 11A and 11B are diagrams showing the optical intensity profiles of the waveguide modes in the optical waveguide element according to the second embodiment.
Figure 11B:
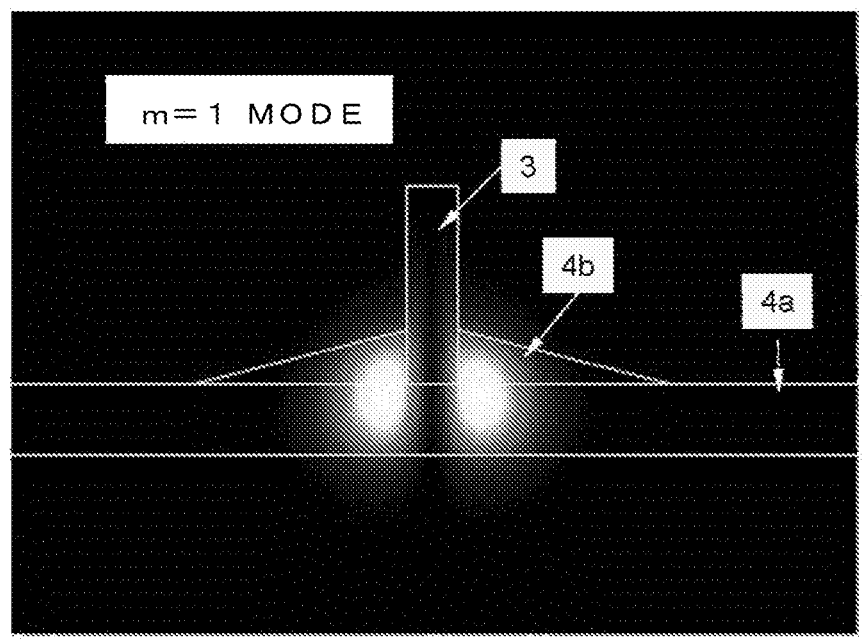

FIGS. 11A and 11B are diagrams showing the optical intensity profiles of the waveguide modes in the optical waveguide element 100B. More precisely, FIG. 11A shows the profile of the m=0 mode, and FIG. 11B shows the profile of the m=1 mode.

The main component of the electric field extends vertically in the TM mode, and the main component of the electric field extends horizontally in the TE mode. At least four wave guiding modes exist, TM, m=0 mode, TE, m=0 mode, TM, m=1 mode, and TE, m=1 mode. The lithium niobate film is material exhibiting birefringence. If the film is c-axis orientated, it has refractive index ne in the vertical direction of the electric field (i.e., refractive index for extraordinary light), which is smaller than the refractive index no in the horizontal direction of the electric field (i.e., refractive index for ordinary light). Usually, the effective refractive index for the m=0 mode is larger than the effective refractive index for the m=1 mode. Due to this birefringence, however, the effective refractive index for TM, m=0 mode is almost equal to the effective refractive index for TE, m=1 mode resulting in the mixed mode in some cases.

In the optical waveguide element 100B according to this embodiment, the light component of TM, m=0 mode is confined in the ridge part 3 as seen from FIG. 11A, and the light component of TE, m=1 mode is confined in the inclining part 4b as seen from FIG. 11B. Hence, the light component of TE, m=1 mode would not expand greatly.

Figure 12:
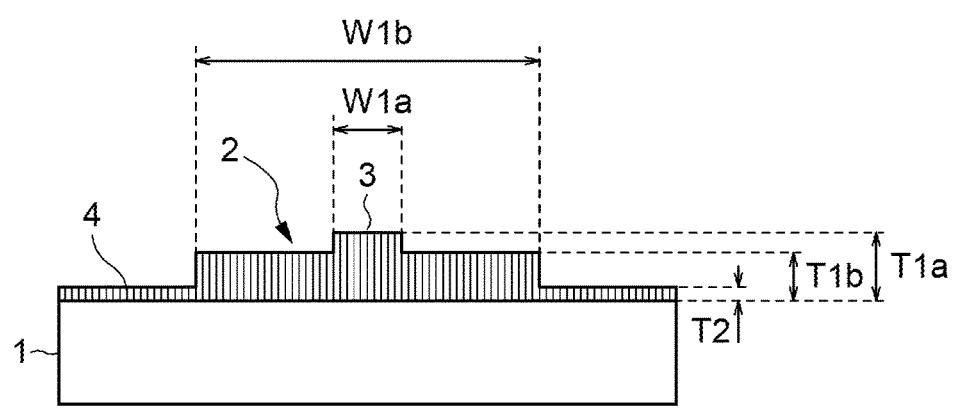
FIG. 12 is a sectional view of an optical waveguide element having two-step ridge structure.

Some of the inventors hereof profoundly studied how to suppress the coupling of TM fundamental mode to TE higher-order mode, and invented the two-step ridge structure shown in FIG. 12 and filed a patent application at the Japan Patent Office on Jun. 6, 2014 (see Japanese Patent Application Laid-open No. 2015-230466). As shown in FIG. 12, the two-step ridge structure has a part having film thickness ha and two parts located at the sides of that part and having film thickness T1b (<T1a). The ridge defining the first step and having the film thickness T1a has ridge width W1a, and the ridge defining the second step having thickness T1b has ridge width W1b (>W1a). The slab part 4 has film thickness T2 (<T1b). In the optical waveguide element 300 shown in FIG. 12, the coupling of TM fundamental mode to TE high-order mode can be suppressed, reducing the propagation loss.

Figure 13:
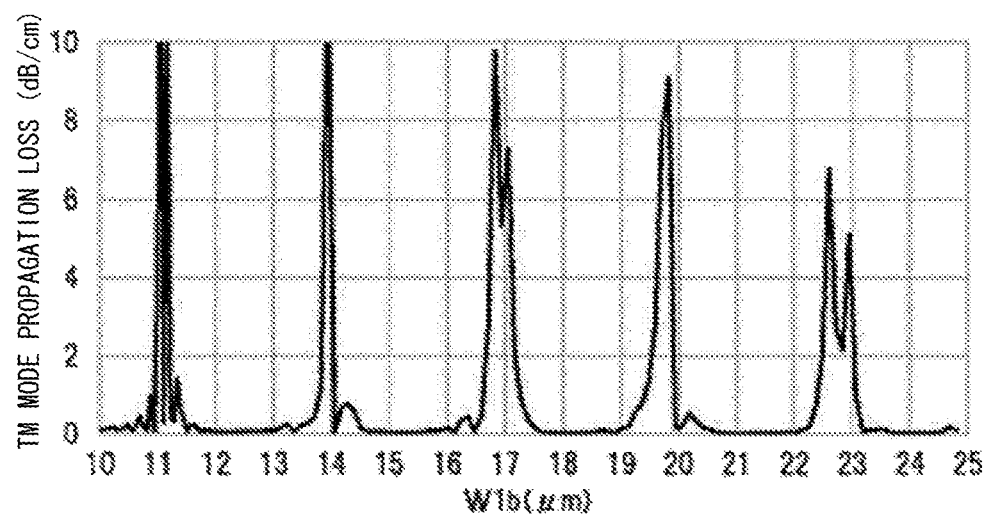
FIG. 13 is a graph showing a characteristic of the optical waveguide element shown in FIG. 12.

In the two-step ridge structure, however, the propagation loss abruptly increases as shown in FIG. 13 if the ridge defining the second step has width W1b exceeding a prescribed value. The optical waveguide element 300 must therefore be designed not to form a second step having such ridge width. However, the thicknesses T1a, T1b and T2 of the components constituting the waveguide layer 2 may have thicknesses different from the design values during the manufacture of the optical waveguide element. The ridge width W1b may therefore deviate from the value for achieving a small propagation loss. Inevitably, the propagation loss may increase.

The optical waveguide element 100B according to this embodiment prevents the propagation loss from changing abruptly contrary to the two-step ridge structure having a ridge shaped so specifically as sown in FIG. 12. The element 100B can therefore preserve desirable characteristics even if the ridge part 3 or the inclining part 4b fail to have designed shape or designed size.

Figure 14A:
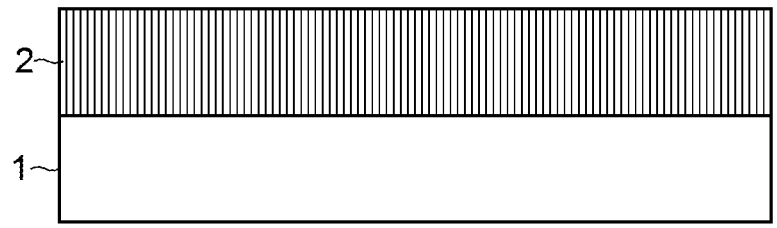
FIGS. 14A, 14B and 14C illustrate the steps of manufacturing the optical waveguide element according to the second embodiment.
Figure 14B:
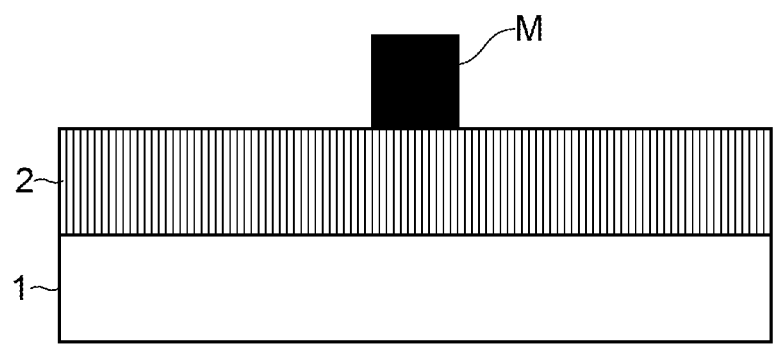
Figure 14C:
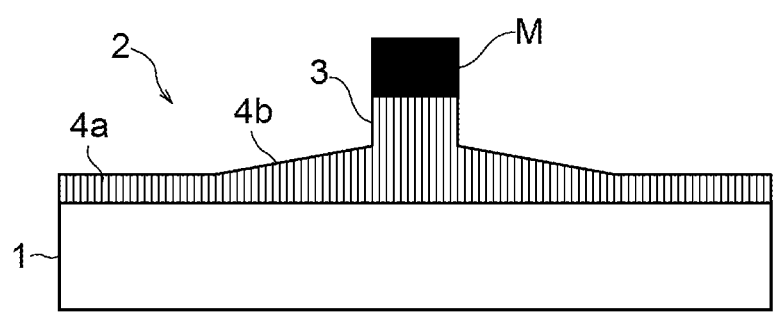

FIGS. 14A, 14B and 14C illustrate the steps of manufacturing the optical waveguide element 100B according to this embodiment.

First, as shown in FIG. 14A, a waveguide layer 2 is formed on a substrate 1. Then, as shown in FIG. 14B, a mask M made of resist or metal is formed on that part of the waveguide layer 2, which will be a ridge part 3. Next, the waveguide layer 2 is etched by means of ion-milling or RIE (Reactive Ion Etching). The etching is performed slantwise, while rotating the substrate. Hence, that part of the waveguide layer 2, which lies around the mask M is less etched than the other part. As a result, the waveguide layer 2 has an inclining part 4b as illustrated in FIG. 14C. The shape of the inclining part 4b can be adjusted by changing the angle at which the waveguide layer 2 is etched. An optical waveguide element 100B formed with the waveguide layer 2 having a desirable shape can therefore be manufactured.

An example of an optical modulator using this optical waveguide element 100B according to this embodiment will be described below.

Figure 15A:
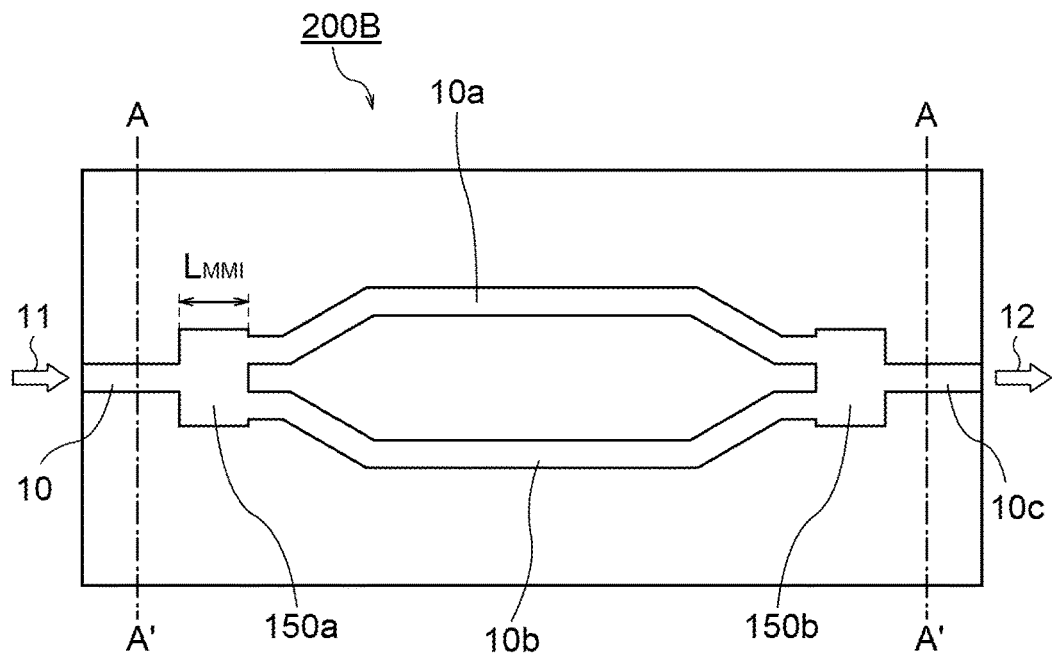
FIGS. 15A and 15B are plan views of a Mach-Zehender optical modulator according to an embodiment of the present invention, where
Figure 15B:
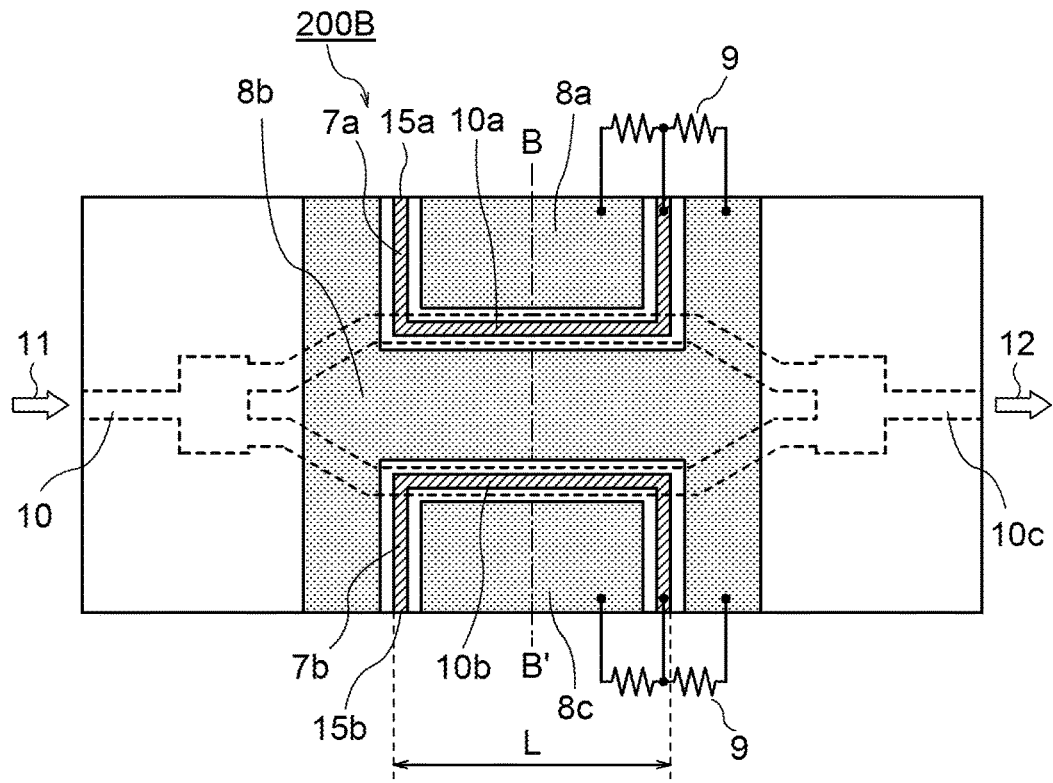

FIG. 15A and FIG. 15B are plan views of a Mach-Zehender optical modulator 200B according to the embodiment of this invention. FIG. 15A illustrates only the optical waveguide, and FIG. 15B illustrates main components of the optical modulator 200B, including the electrodes.

As may be seen from FIG. 15A, the optical modulator 200B is a Mach-Zehender interferometer including an optical waveguide 10. The optical waveguide 10 is branched into two optical waveguides 10a and 10b by a multimode interference branching waveguide 150a, and is connected together by a multimode interference branching waveguide 150b into an optical waveguide 10C. As shown in FIG. 15B, two first electrodes 7a and 7b are provided on the optical waveguides 10a and 10b, respectively, forming a dual-drive electrode structure. The optical modulator 200B is a device that applies a voltage to the Mach-Zehender interferometer including an optical waveguide 10, thereby modulating the light propagating the optical waveguide 10.

Figure 16:
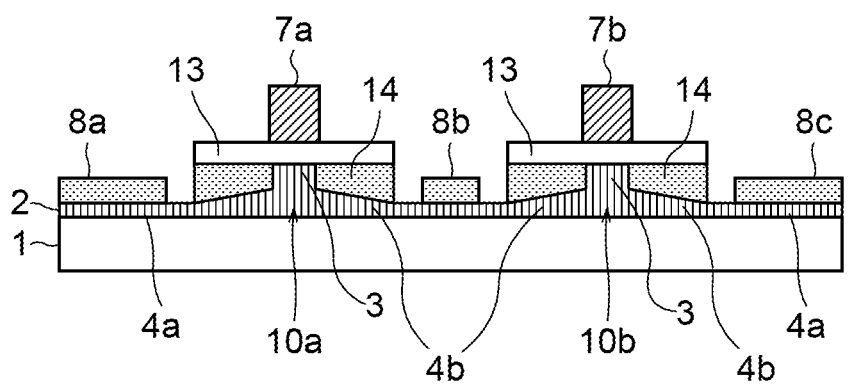
FIG. 16 is a cross sectional view taken along line B-B' shown in FIG. 15B.

FIG. 16 is a sectional view of the optical modulator 200B, taken along line B-B' shown in FIG. 15B. A sectional view of the optical modulator 200B, taken along line A-A' shown in FIG. 15A, is identical to the sectional view of the optical waveguide element 100B shown in FIG. 8.

In this embodiment, a sapphire substrate is used as substrate 1 and a lithium niobate film is formed on the major surface of the substrate. The waveguide layer 2 constitutes optical waveguides 10a and 10b, each composed of a ridge part 3 and an inclining part 4b. A buffer layer 13 is formed on the ridge part 3 of the optical waveguide 10a, and a first electrode 7a is formed on the buffer layer 13. Similarly, a buffer layer 13 is formed on the ridge part 3 of the optical waveguide 10b, and a first electrode 7b is formed on the buffer layer 13. Second electrodes 8a, 8b and 8c are spaced apart, with the first electrodes 7a and 7b located among them, and contact the upper surfaces of the slab parts 4 of the waveguide layer 2. Dielectric layers 14 are formed, each contacting the lower surface of the associated buffer layer 13 and the sides of the associated ridge part 3.

The operating principle of the optical modulator 200B will be explained. As shown in FIG. 15B, the two first electrodes 7a and 7b are connected to the second electrodes 8a, 8b and 8c via terminal resistors 9, and function as traveling-wave electrodes. The second electrodes 8a, 8b and 8c are used as ground electrodes, and receive two so-called complementary signals, i.e., positive and negative signals having the same absolute value, not out of phase, from the input sides 15a and 15b of the first electrodes 7a and 7b of the optical modulator 200B. Since the lithium niobate film has electro-optical effect, the refractive indices of the optical waveguides 10a and 10b are changed to $+\Delta n$ and $-\Delta n$, respectively, by the electric fields applied to the optical waveguides 10a and 10b. The phase difference between the optical waveguides 10a and 10b therefore changes, modulating the intensity of signal light. The signal light so modulated in intensity is output from an optical waveguide 10c provided in the output side of the optical modulator 200B.

The waveguide layers 2 provided in the optical waveguides 10a, 10b and 10c have the same shape as described with reference to FIG. 8. That is, the waveguide layer 2 includes inclining parts 4b that are located on the sides of the ridge part 3 and gradually thinned away from the ridge part 3, and flat parts 4a located on the sides of the inclining part 4b and having uniform thickness.

The maximum thickness T2 of the inclining part 4b, the width W1 of the ridge part 3, and the thickness T1 of the ridge part 3 are set as follows:

$0.1 \leq T2/\lambda \leq 0.37$, $0.3 \leq W1/\lambda \leq 1.2$, $0.5 \leq T1/\lambda \leq 2.0$, where $\lambda$ is the wavelength of the light propagating through the ridge part 3.

The optical modulator 200B can therefore efficiently confine the light at the ridge part with a small propagation loss, while being prevented from operating in the mixed mode. Thus, the optical modulator 200B can have a small insertion loss, a high extinction ratio and low $V\pi L$.

Figure 17:
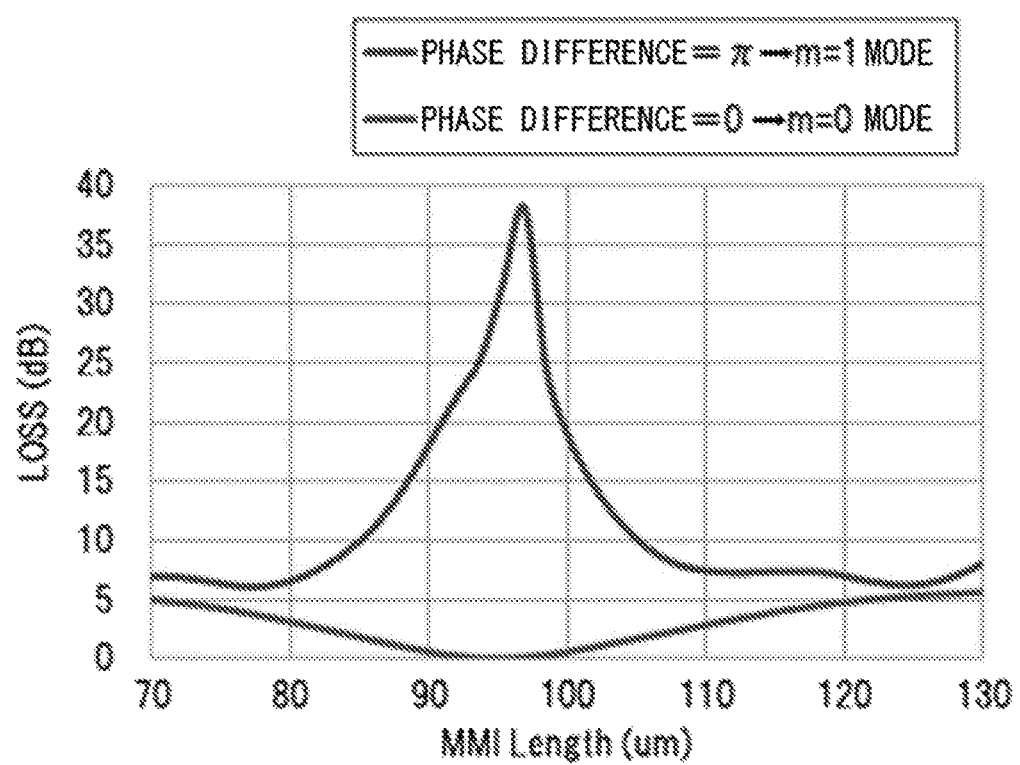
FIG. 17 is a graph showing the characteristic of the multimode interference branching waveguide shown in FIG. 15A.

The multimode interference branching waveguide 150 is characterized in that the propagation loss is larger in the m=1 mode than in the m=0 mode. FIG. 17 is a graph showing the characteristic of the multimode interference branching waveguide 150. In FIG. 17, the length $L_{MMI}$ of the waveguide 150 is plotted on the horizontal axis, and the attenuation of the signal is plotted on the vertical axis. As shown in FIG. 17, the m=1 mode component can be greatly attenuated, while scarcely attenuating the m=0 mode component by setting the length $L_{MMI}$ of the waveguide 150 to a prescribed value. This can be achieved in the instance shown in FIG. 17, if the length $L_{MMI}$ of the waveguide 150 is set to about 97 μm.

In this multimode interference branching waveguide 150, the m=0 mode component is branched, without being attenuated, into two optical waveguides 10a and 10b, and the m=1 mode component is attenuated and scarcely output from the optical waveguides 10a and 10b. The waveguide 150 can therefore be handled in the same way as a single-mode interference branching waveguide, though the light propagates through it in both TM, m=0 mode and TM, m=1 mode.

As specified above, the optical waveguide element 100B according to this embodiment has a slab part 4 that has an inclining part 4b around the ridge part 3. Therefore, the propagation loss would not greatly change even if dimensional changes occur during the manufacture of the element 100B. The optical waveguide element 100B has, but a small propagation loss, even if dimensional changes occur during the manufacture.

It is apparent that the present invention is not limited to the above embodiments, but may be modified and changed without departing from the scope and spirit of the invention.

Figure 18:
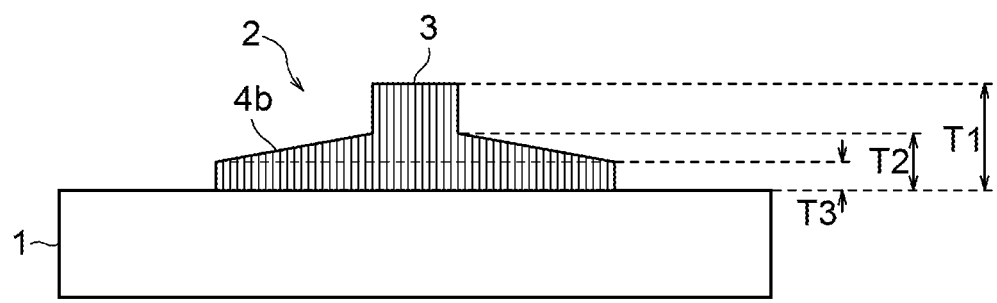
FIG. 18 is a sectional view of an optical waveguide element according to a modification of the second embodiment.

In the optical waveguide element 100B according to the second embodiment, the slab part 4 has a flat part 4a. According to this invention, however, the slab part 4 need not have a flat part 4a. As in the modification shown in FIG. 18, the slab part 4 may not have a flat part. Even if the slab part 4 is so shaped, the optical waveguide element can have characteristics similar to those of the optical waveguide element 100B shown in FIG. 8.

In any one of the embodiments described above, the waveguide layer 2 that is a lithium niobate film orientated in the c-axis, and guides light in TM, m=0 mode. Nonetheless, this invention can be applied to the case where the c-axis is orientated in a plane, as will be explained below.

If the c-axis is orientated in a plane, the electro-optical effect increases in TE mode. The optical waveguide element is operated in TE, m=0 mode. If the c-axis is orientated in plane, the refractive index ne (for extraordinary light) the electric field has in the horizontal direction (parallel to the c-axis) is smaller than the refractive index no (for ordinary light) the electric field has in the horizontal vertical. After all, the in-plane orientation of the c-axis is equivalent to TM and TE inverted in the vertical orientation, and this invention works well. If the c-axis is orientated in plane, the effective refractive index for TE, m=0 mode is almost equal to the effective refractive index for TM, m=1 mode in some cases. The optical waveguide element may therefore operate in the mixed mode. However, the element can be prevented from operating in the mixed mode if the maximum thickness of the inclining part, the width of the ridge part and the thickness of the ridge part are set to the values identical to those for the vertical orientation.

The optical modulators 200A and 200B shown in FIG. 6 and FIGS. 15A and 15B, respectively, have been exemplified as optical modulators using the optical waveguide elements 100A or 100B. Nevertheless, the optical modulator using an optical waveguide element according to the present invention is not limited to the optical modulators 200A and 200B.

Figure 19A:
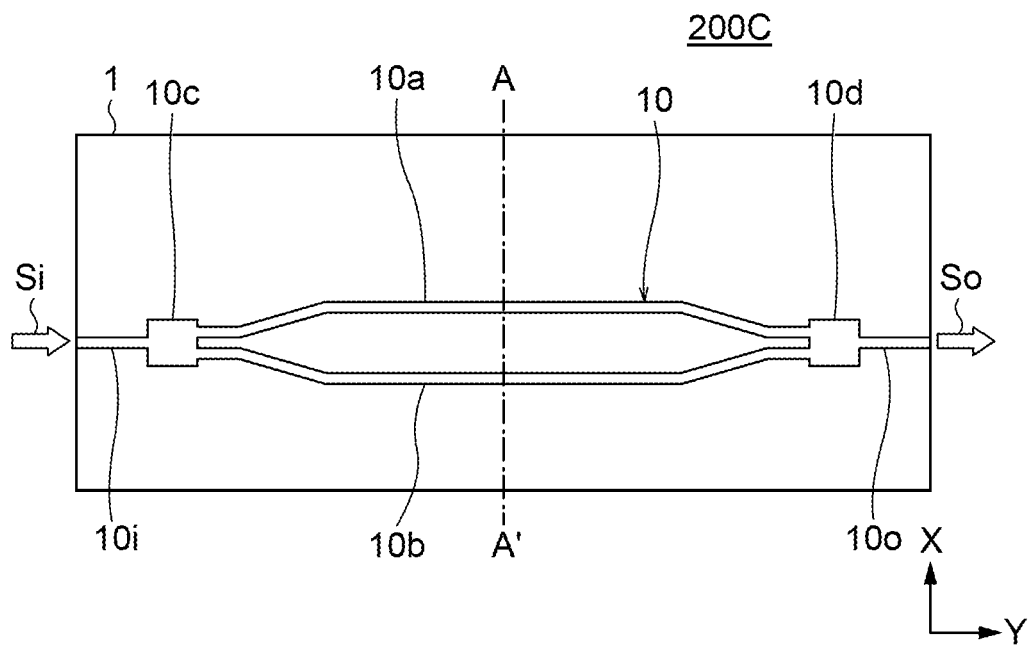
FIGS. 19A and 19B are plan views of an optical modulator according to another example, where
Figure 19B:
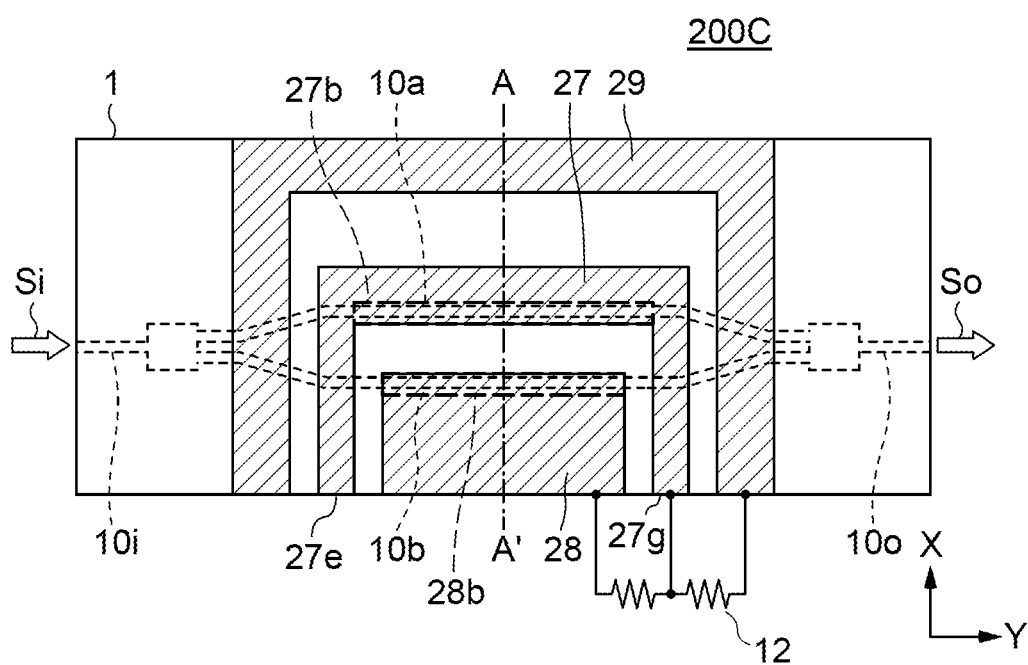

FIGS. 19A and 19B are plan views of an optical modulator 200C according to another example. More precisely, FIG. 19A illustrates the optical waveguide only, and FIG. 19B shows the main optical modulator 200C having traveling-wave electrodes.

As shown in FIGS. 19A and 19B, the optical modulator 200C includes a Mach-Zehender optical waveguide 10, a signal electrode 27, a first ground electrode 28, and a second ground electrode 29. The optical waveguide 10 has first and second optical waveguides 10a and 10b formed on a substrate 1 and arranged parallel to each other. The signal electrode 27 extends along the first optical waveguide 10a. The first ground electrode 28 extends along the second optical waveguide 10b. The second ground electrode 29 is provided, opposing the first ground electrode 28 across the signal electrode 27.

The Mach-Zehender optical waveguide 10 is an optical waveguide having the structure of the Mach-Zehender interferometer. The optical waveguide 10 has first and second optical waveguides 10a and 10b. The optical waveguides 10a and 10b are branched from one input optical waveguide 10i by a multimode interference branching waveguide 10c, and are combined by a multimode interference branching waveguide 10d, forming an output optical waveguide 10o. Input light Si is therefore branched by the multimode interference branching waveguide 10c into two light beams. The light beams propagate through the optical waveguides 10a and 10b, respectively, and are then combined by the multimode interference branching waveguide 10d into modulated light So. The modulated light So is output from the output optical waveguide 10o.

The signal electrode 27 is positioned between the first ground electrode 28 and the second ground electrode 29 as viewed from above the optical modulator 200C. One end 27e of the signal electrode 27 is the signal input terminal. The other end 27g of the signal electrode 27 is connected to the first and second ground electrodes 28 and 29 via a terminal resistor 22. The signal electrode 27 and the first and second ground electrodes 28 and 29 function as coplanar traveling-wave electrodes. The signal electrode 27 and the first ground electrode 28 are double-layer electrodes. The lower layer 27b of the signal electrode 27, indicated by broken lines, overlaps the first optical waveguide 10a as viewed from above the optical modulator 200C. Similarly, the lower layer 28b of the first ground electrode 28, indicated by broken lines, overlaps the second optical waveguide 10b as viewed from above the optical modulator 200C.

An electric signal (modulation signal) is input to the end 27e of the signal electrode 27. Since the first and second optical waveguides 10a and 10b are made of material having electro-optical effect, such as lithium niobate, the electric field applied to the first and second optical waveguides 10a and 10b changes the refractive indices of the optical waveguides 10a and 10b to +Δn and −Δn, respectively. As a result, the phase difference between the two optical waveguides 10a and 10b changes. An optical signal modulated by this change in phase difference is output from the output optical waveguide 10o.

The optical modulator 200C according to this embodiment has one signal electrode 27 and is single-drive type. Therefore, the first ground electrode 28 can therefore have a sufficient area, and the optical modulator 200C can operate at high frequencies. Further, since the second ground electrode 29 opposes the first ground electrode 28 across the signal electrode 27, the radiation loss can be reduced. The optical modulator 200C can therefore acquire a good high-frequency characteristic.

Example 1

Figure 20:
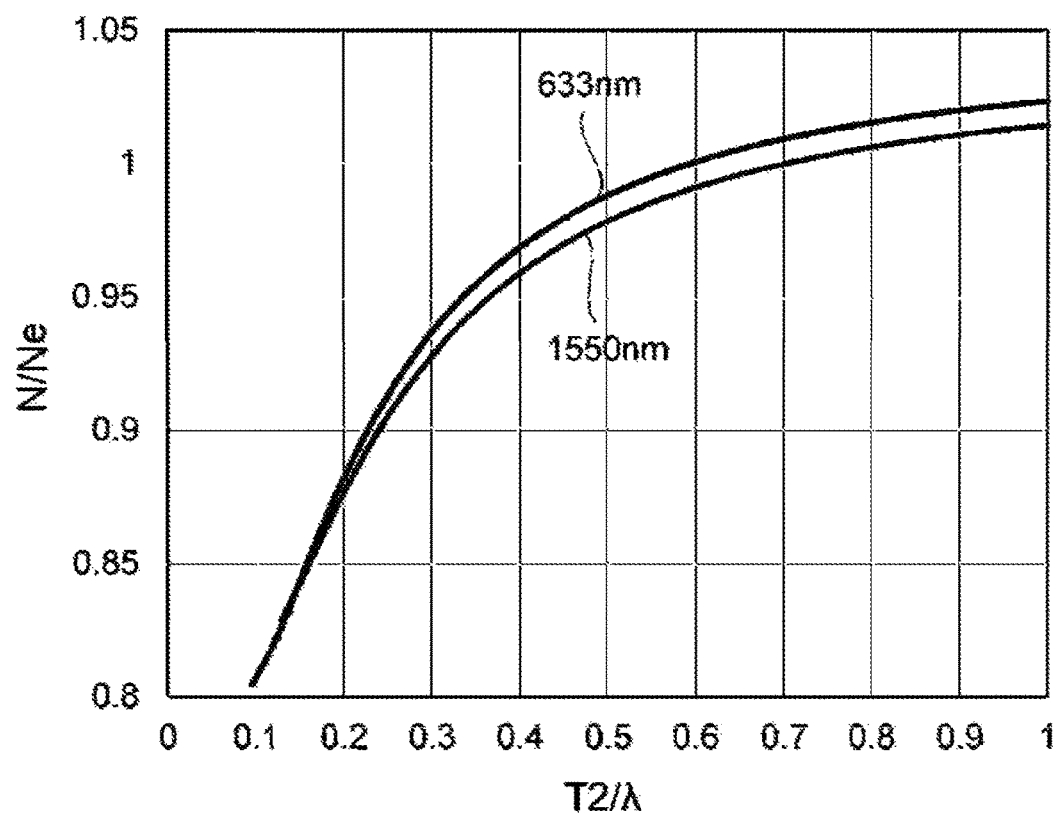
FIG. 20 is a graph showing a data of the example 1.

Simulation was conducted to see how the effective refractive index N for TE slab mode changes in the optical waveguide element 100A shown in FIG. 2 if the thickness T2 of the slab part 4 is changed. The result of the simulation is shown in FIG. 20. In FIG. 20, Ne is the refractive index the lithium niobate film exhibits to extraordinary light. The actual effective refractive index for the TM fundamental mode is smaller than refractive index Ne depending on the ridge width W or the like. Hence, the threshold value for N/Ne would not be 1.

As shown in FIG. 20, the effective refractive index N for the TE slab mode decreases as the thickness T2 of the slab part 4 decreases not only in the case where the wavelength is 1550 nm, but also in the case where the wavelength is 633 nm.

Example 2

An optical waveguide element 100A of the type shown in FIG. 2 was actually produced, and the relation between the ridge width W1 and the propagation loss in the TM fundamental mode was determined. The thickness T2 of the slab part 4 was 0.23λ for Sample 2A, and 0.71λ for Sample 2B. Both Samples 2A and 2B had a ridge part having thickness T1 of 0.97λ, and the wavelength λ was 1.55 μm. The result is shown in FIG. 21.

Figure 21:
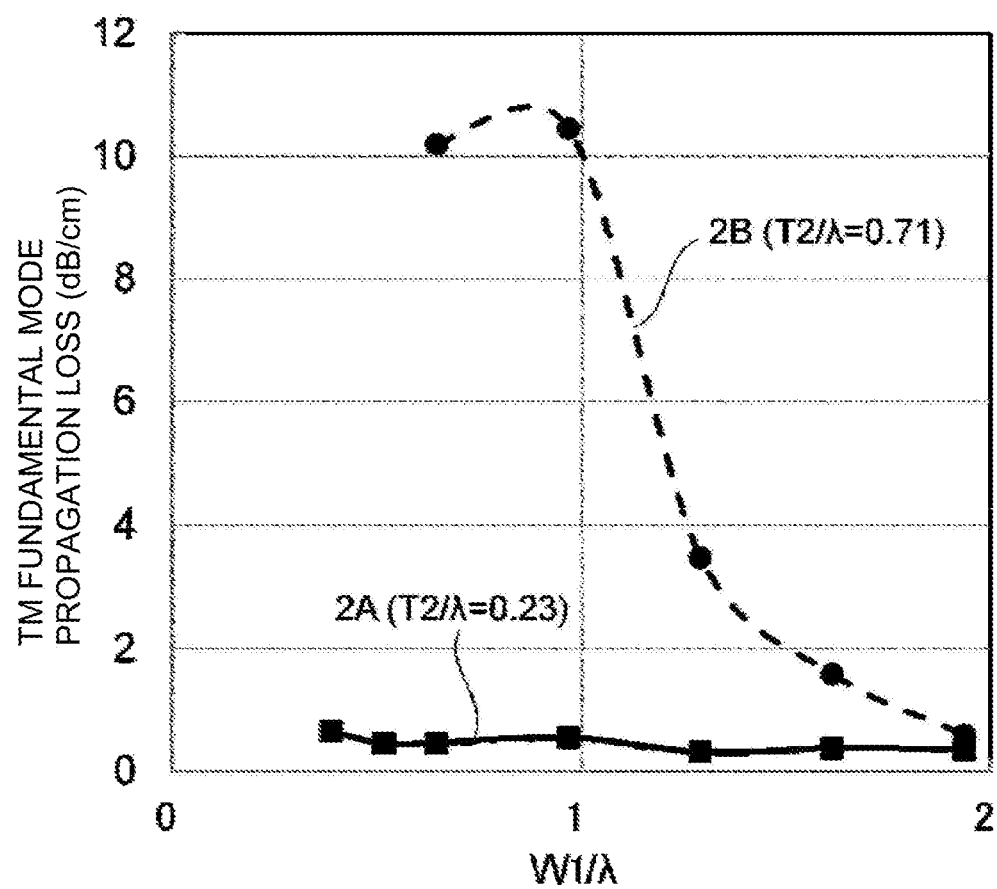
FIG. 21 is a graph showing a data of the example 2.

As FIG. 21 shows, the propagation loss greatly increased as the ridge width W1 decreased in Sample 2B that does not satisfy the relation of T2/λ<0.4, and, as the ridge width W1 became smaller than λ, the propagation loss reached 10 dB/cm. By contrast, in Sample 2A that satisfies the relation of T2/λ<0.4, the propagation loss was suppressed to a small value and was less than 1 dB/cm over the entire range of W1/λ.

Example 3

An optical waveguide element 100A of the type shown in FIG. 2 was actually produced, and the relation between the thickness T2 of the slab part 4 and the propagation loss in TM fundamental mode was determined. The ridge width W was 0.65λ for Sample 3B, 0.97λ for Sample 3B, and 1.61λ for Sample 3C. Samples 3A to 3C had ridge thickness T1 of 0.97λ, and the measuring wavelength λ was 1.55 μm. The result is shown in FIG. 22.

Figure 22:
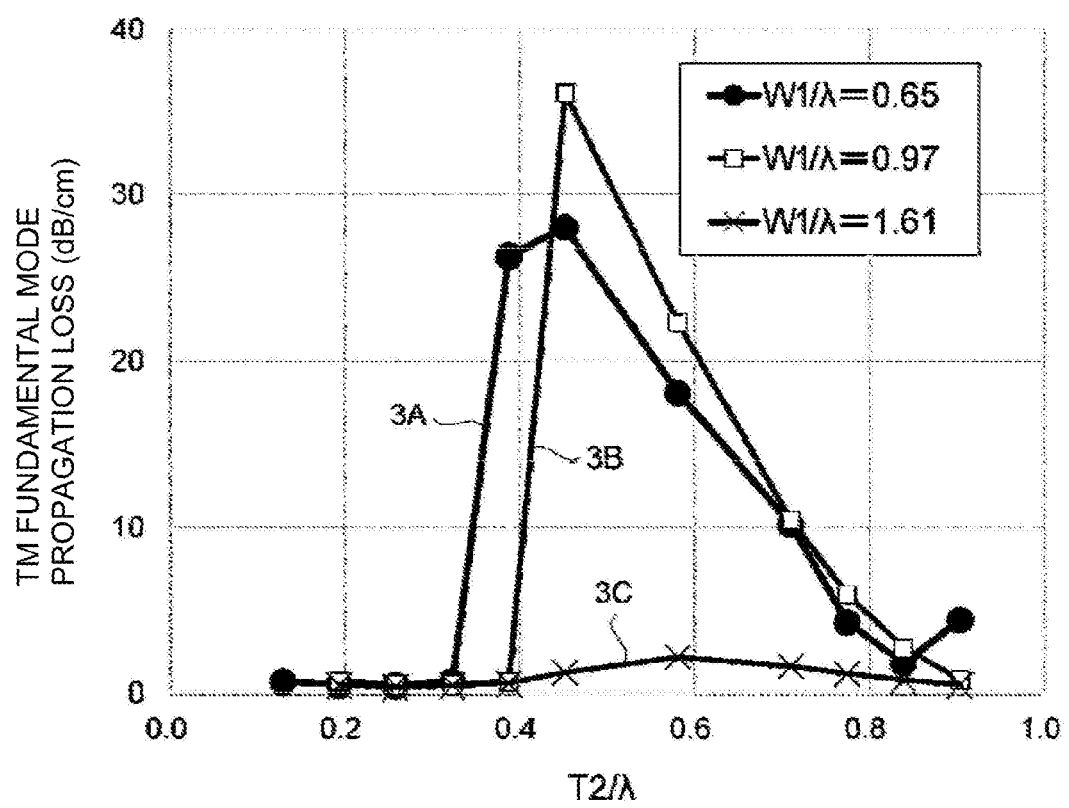
FIG. 22 is a graph showing a data of the example 3.

As FIG. 22 shows, in Sample 3C having the ridge width W1 equal to or larger than λ, the propagation loss was small, regardless of the thickness T2 of the slab part 4, but the light propagated in multimode. By contrast, Samples 3A and 3B that have the ridge width W1 smaller than λ operated in the single mode. Samples 3A and 3B had a large propagation loss if the slab part 4 had thickness 12 of 0.4λ or more. When the thickness T2 of the slab part 4 was reduced to less than 0.4λ, however, the propagation loss abruptly decreased to a similar level in Sample 3C. The threshold value of T2, at which the propagation loss abruptly decreases, changes a little, depending on the ridge width W1.

Example 4

Simulation was conducted to see how the effective refractive index N changes in the optical waveguide element 100A shown in FIG. 2 if the ridge width W1 is changed. The result of the simulation is shown in FIGS. 23A to 23F. In the cases of FIGS. 23A to 23F, T2/λ were 0.42, 0.39, 0.32, 0.23, 0.13 and 0.06, respectively. In FIGS. 23A to 23F, the effective refractive index N is shown for both TM fundamental mode and TE slab mode. The thickness T1 of the ridge part is 0.97λ, and the wavelength λ is 1.55 μm. Ne is the refractive index the lithium niobate film has with respect to extraordinary light. In FIGS. 23A to 23F, the solid line indicates values for TM fundamental mode, and the broken line indicates values for TE slab mode.

Figures 23A, 23B, 23C, 23D, 23E, 23F:
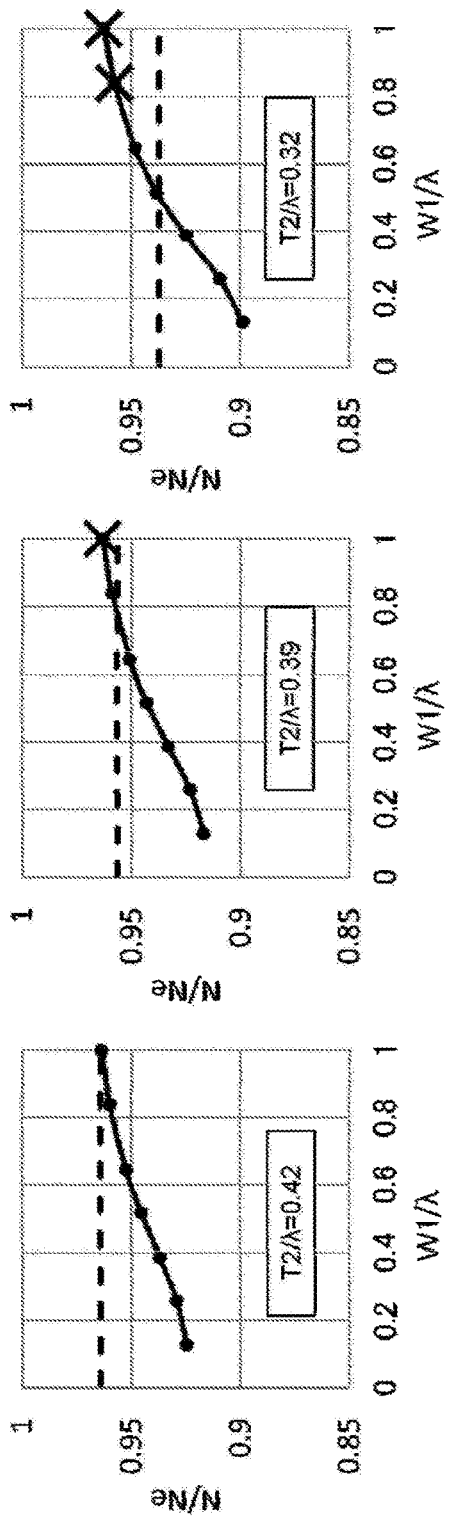
FIGS. 23A to 23F are graphs showing a data of the example 4.

As shown in FIG. 23A, if T2/λ=0.42, the effective refractive index for TM fundamental mode did not exceed the effective refractive index for TE slab mode in the region where the ridge width W1 is less than λ. By contrast, if T2/λ<0.4, the effective refractive index for TM fundamental mode could be larger than the effective refractive index for TE slab mode by setting the ridge width W1 to a value less than λ, as seen from FIGS. 23B to 23F. In FIGS. 23B to 23F, mark X indicates that the optical waveguide element 100A operated in multimode. The ridge width W at which the element 100A starts operating in multimode depends on the thickness T2 of the slab part 4.

Example 5

Figure 24:
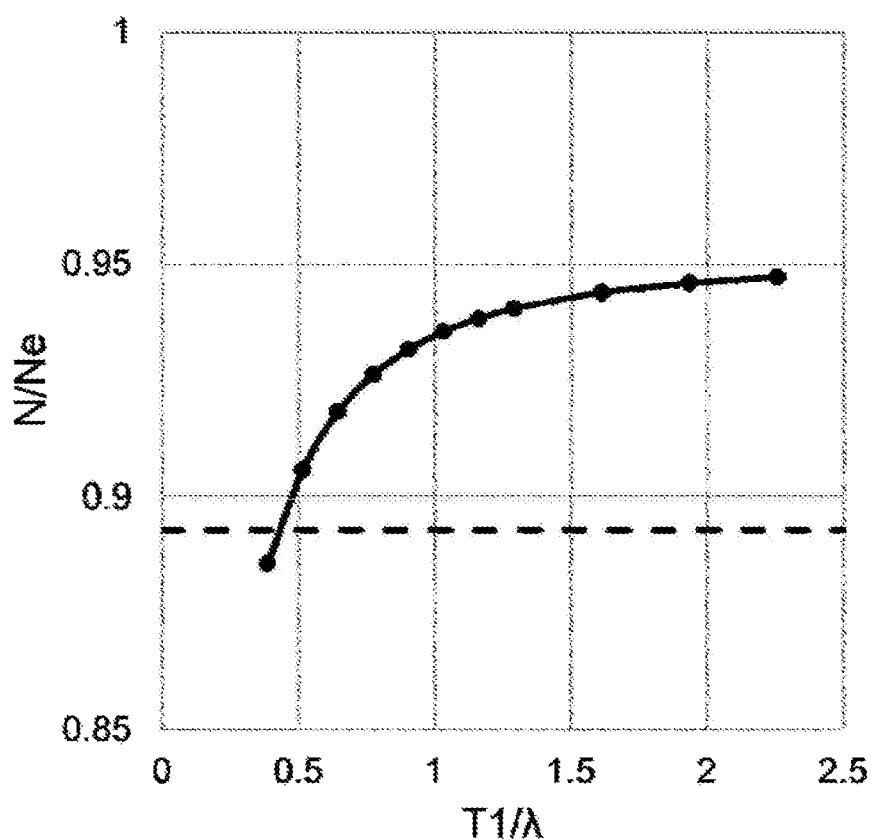
FIG. 24 is a graph showing a data of the example 5.

Simulation was conducted to see how the effective refractive index N changes in the optical waveguide element 100A shown in FIG. 2 if the thickness T1 of the ridge part is changed. T2/λ, W1/λ and wavelength λ were set to 0.23, 0.52 and 1.55 μm, respectively. The result is shown in FIG. 24. The effective refractive index N is specified for both TM fundamental mode and TE slab mode. Ne is the refractive index the lithium niobate film has with respect to extraordinary light. The solid line indicates the value for TM fundamental mode, and the broken line indicates the value for TE slab mode.

As shown in FIG. 24, as the thickness Ti decreased, the effective refractive index for TM fundamental mode decreased, particularly when T1/λ is less than 0.5 (T1/λ<0.5), and the light could be confined at the ridge part, but weakly. In the case of FIG. 24, the refractive index for TM fundamental mode could be larger than the effective diffractive index for TE slab mode, when T1/λ is equal to or more than 0.5 (T1/λ≥0.5).

Example 6

An optical modulator 200A of the type shown in FIG. 7 was produced, and the relation between the thickness T2 of the slab part 4 and value VπL was determined. The ridge width W1 was 0.52λ, and the ridge thickness T1 was 0.97λ, and the measuring wavelength λ was 1.55 μm. Vπ is the half-wave voltage defined as the difference between voltages V1 and V2, at which the optical output is maximal and minimal, respectively. Thus, Vπ is a drive voltage. L is the length of the electrode provided in the waveguide. Vπ is inversely proportional to L. Since VπL is constant, Vπ decreases to half if L increases twice. In view of this, VπL, i.e., product of Vπ and L, is an important index representing the performance of the optical modulator 200A. The smaller VπL, the smaller the optical modulator 200A is, or the lower the voltage at which it is driven. The optical modulator 200A was driven on trial. The result is shown in FIG. 25.

Figure 25:
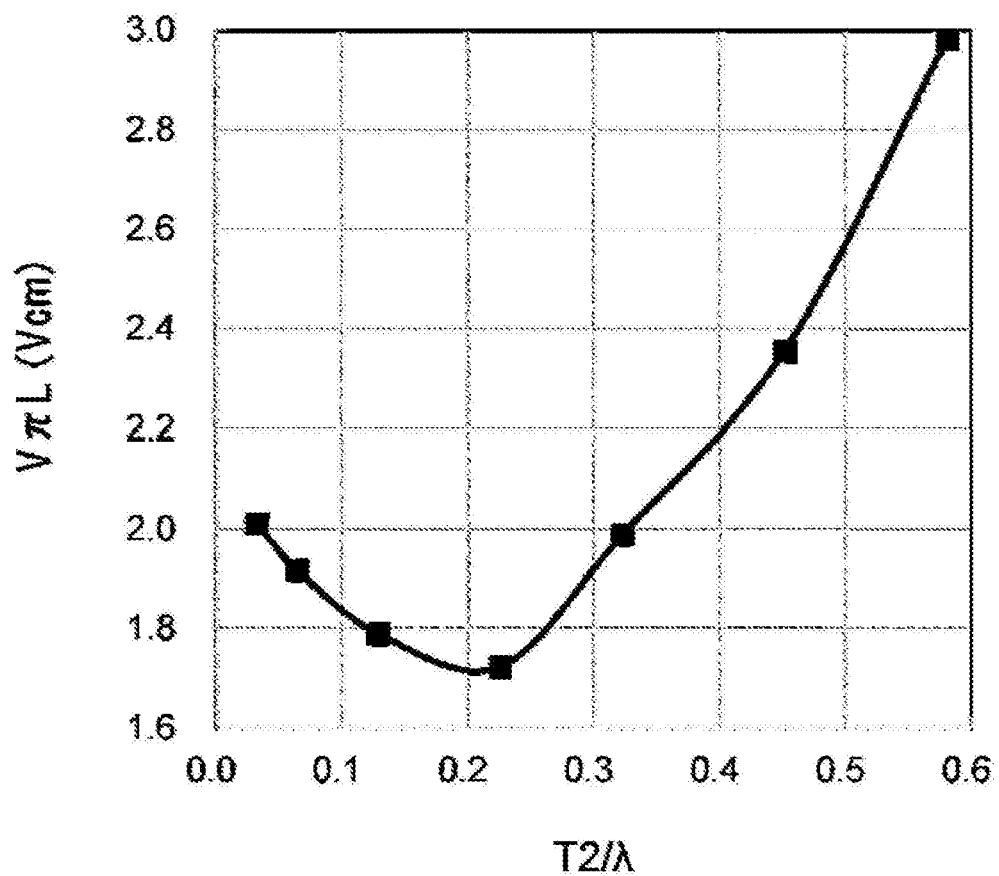
FIG. 25 is a graph showing a data of the example 6.

As shown in FIG. 25, the value of VπL decreased as the thickness T2 of the slab part 4 decreased, reaching the minimum value when the thickness T2 of the slab part 4 was about 0.2λ. Thus, VπL has a desirable value if T2/λ is smaller than 0.4 (T2/λ<0.4). When T2 was 0.2λ or less, VπL gradually increased. This is because the electric field applied to the ridge part 3 decreases if the thickness T of the slab part 4 decreased too much.

Example 7

Simulation was conducted to see whether the optical waveguide element 101A shown in FIG. 3 operates in the TM-TE mixed mode if the ridge width W1 and the inclination angle θA are changed. In the simulation, T1/λ, T2/λ and wavelength λ were set to 0.97, 0.23 and 1.55 μm, respectively. The result is shown in FIG. 26. In FIG. 26, O shows that the TE component was less than 1% and the element operated in substantially pure TM, m=0 mode, and X shows that the TE component was 1% or more and the element operated in the TM-TE mixed mode.

As seen from FIG. 26, TE mode was prevented from mixing with TM mode by selecting an appropriate value for the ridge width W1 if the inclination angle θA was 70° or more. If the inclination angle θA was less than 70°, however, TE mode mixed with TM mode, whichever value was selected for the ridge width W1.

Example 8

Simulation was conducted to see in which waveguide mode the optical waveguide element 100B having the structure shown in FIG. 8 operates if the ridge width W1 and the maximum thickness T2 of the inclining part 4b are changed. In the simulation, the thickness T1 of the ridge part was set to 0.97λ, the film thickness T3 of the flat part 4a of the slab part 4 to 0.13λ, the wavelength λ to 1.55 μm, and the width W2 of the inclining part 4b to 5 μm. The result is shown in FIG. 27. In FIG. 27, O and X show the same events as in FIG. 26.

As seen from FIG. 27, the optical waveguide element 100B operated in almost pure TM, m=0 mode by selecting appropriate values, respectively for the ridge width W1 and the maximum thickness T2 of the inclining part 4b, if W1/λ and T2/λ range as follows:

$W1/λ=0.39$ to $1.16$ $T2/λ=0.26$ to $0.35$.

To prevent the optical waveguide element 100B from operating in the mixed mode, the effective refractive index (TM, m=0 mode) must be larger than the effective refractive index (TE, m=1 mode), namely:

Index(TM,$m=0$ mode)>index(TE,$m=1$ mode).

In the m=1 mode, the light is confined mainly at the inclining part 4b, and the effective refractive index for the m=1 mode can be reduced by decreasing the maximum thickness T2 of the inclining part 4b. In the m=0 mode, the light is confined mainly at the ridge part 3, and the effective refractive index changes only a little even if the maximum thickness T2 is decreased. Hence, if the maximum thickness T2 is decreased, satisfying the following relation:

Effective refractive index(TM,$m=0$ mode)>effective refractive index(TE,$m=1$ mode).

As may be seen from FIG. 27, T2/λ must be equal to or smaller than 0.37 (T2/λ≤0.37) in order to prevent the element 100B from operating in the mixed mode.

The effective refractive index for the slab mode is smaller than the effective refractive index for the m=1 mode. Therefore, if the effective refractive index (for TM, m=0 mode) is larger than the effective refractive index (for TE, m=1 mode), the following relation is automatically satisfied:

Effective refractive index(TM,m=0 mode)>effective refractive index(TE slab mode).

The TM, m=0 mode would not, therefore, be coupled to the TE slab mode to increase the propagation loss.

Example 9

Simulation was conducted to see how the optical waveguide element 100B having the structure of FIG. 8 operates if the maximum film thickness T2 of the inclining part 4b and the film thickness T3 of the flat part 4a of the slab part 4 are changed. The result is shown in FIG. 28. The ridge width W1 was set to 0.77λ, the film thickness T1 of the ridge part 3 to 0.97λ, the wavelength λ to 1.55 µm, and the width W2 of the inclining part 4b to 5 µm. In FIG. 28, O and X show the same events as in FIG. 26 and FIG. 27.

As seen from FIG. 28, the optical waveguide element 100B operated in almost pure TM, m=0 mode by selecting appropriate values, respectively for the maximum thickness T2 of the inclining part 4b and the film thickness T3 of the flat part 4a, if T2/λ and T3/λ range as follows:

$T2/\lambda = 0.26$ to $0.35$ $T3/\lambda = 0.06$ to $0.26$.

As seen from FIG. 28, T2 should be decreased to prevent the element 100B from operating in the mixed mode, and T3 does not influence so much. T2/λ must be equal to or less than 0.37 (T2/λ≤0.37) to prevent the element 100B from operating in the mixed mode.

An optical waveguide element was produced, in which T2/λ=0.29 and T3/λ=0.19, and was evaluated for physical properties. The propagation loss was as small as 1 dB/cm or less. The output light had linear polarization degree of 20 dB or more. This proves that the operating mode did not mix with the TE mode.

Example 10

Several samples of the optical modulator 200B shown in FIGS. 15A and 15B were prepared. The relation between the maximum film thickness 12 of the inclining part 4b and the value VπL was determined for each sample. The samples were produced in three types having T2-T3 values of 0.19λ, 0.23λ and 0.06λ, respectively. Every sample has ridge width W1 of 1.2 µm, ridge part film thickness T1 of 1.5 µm. Note that Vπ is half-wave voltage defined as the difference between voltages V1 and V2, at which the optical output is maximal and minimal, respectively, and is therefore the drive voltage. L is the length of the electrode provided in the waveguide. Vπ is inversely proportional to L. Since VπL is constant, Vπ decreases to half if L increases twice. In view of this, VπL, i.e., product of Vπ and L, is an important index representing the performance of the optical modulator 200B. The smaller VπL, the smaller the optical modulator 200B is, or the lower the voltage at which it is driven. The samples were driven on trial. The result is shown in FIG. 29.

Figure 29:
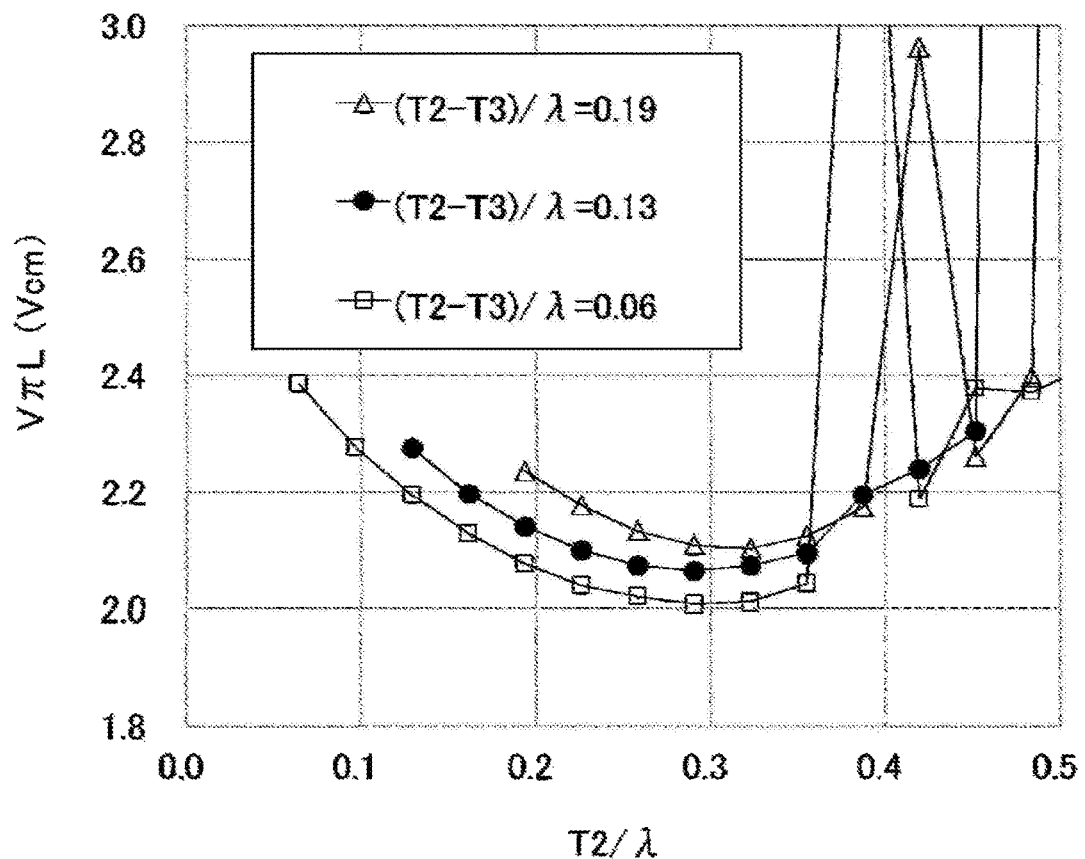
FIG. 29 is a graph showing a data of the example 10.
Figure 30:
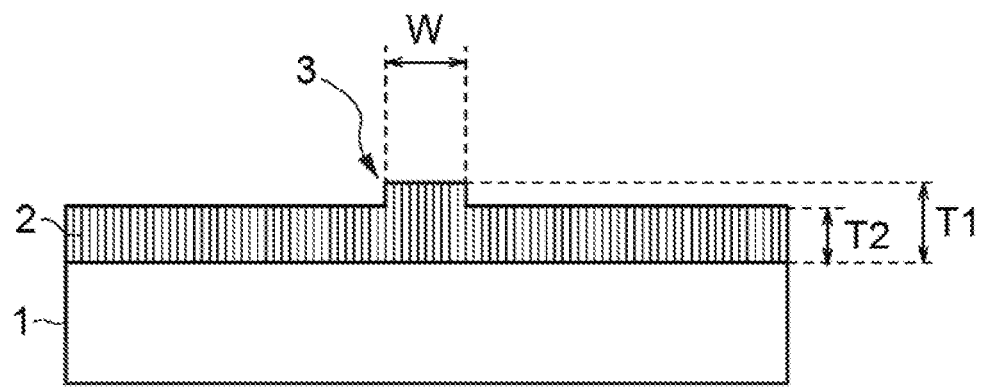
FIG. 30 is a sectional view of a ridge-shaped optical waveguide element of conventional type.

As seen from FIG. 29, VπL is minimal if the maximum film thickness T2 of the inclining part 4b is close to 0.3λ. If the maximum film thickness T2 exceeds 0.37λ, VπL may greatly increase in some cases. This results from the mixed mode. If the maximum film thickness T2 of the inclining part 4b is less than 0.1λ, VπL is at least 15% greater than its minimum value.

What is claimed is:
1. An optical waveguide element comprising:
   a substrate; and
   a waveguide layer formed on the substrate and comprising lithium niobate,
   wherein the waveguide layer has a slab part having a predetermined thickness and a ridge part protruding from the slab part, the slab part having inclining parts located at both sides of the ridge part, the inclining parts being gradually thinned away from the ridge part, and
   wherein a maximum thickness of the slab part is 0.05 times or more and less than 0.4 times a wavelength of a light propagating in the ridge part.
2. The optical waveguide element as claimed in claim 1, wherein a width of the ridge part is 0.1 times or more and less than 1.0 time the wavelength of the light.
3. The optical waveguide element as claimed in claim 1, wherein a thickness of the ridge part is 0.5 times or more and less than 2.0 times the wavelength of the light.
4. The optical waveguide element as claimed in claim 1, wherein sides of the ridge part are inclined by 70° or more.
5. The optical waveguide element as claimed in claim 1, wherein a maximum thickness of the inclining parts is 0.1 times or more and less than 0.37 times the wavelength of the light.
6. The optical waveguide element as claimed in claim 1, wherein a width of the ridge part is 0.3 times or more and less than 1.2 times the wavelength of the light.

* * * * *